United States Patent
Yasura

(10) Patent No.: US 12,548,580 B2
(45) Date of Patent: Feb. 10, 2026

(54) BIT EXTENSION PROCESSING APPARATUS, BIT EXTENSION PROCESSING METHOD, AND BIT EXTENSION PROCESSING PROGRAM STORED IN A NON-TRANSITORY STORAGE MEDIUM

(71) Applicant: JVCKENWOOD CORPORATION, Yokohama (JP)

(72) Inventor: Sadahiro Yasura, Yokohama (JP)

(73) Assignee: JVCKENWOOD CORPORATION, Yokohama (JP)

(*) Notice: Subject to any disclaimer, the term of this patent is extended or adjusted under 35 U.S.C. 154(b) by 157 days.

(21) Appl. No.: 18/542,751

(22) Filed: Dec. 17, 2023

(65) Prior Publication Data

US 2024/0119952 A1    Apr. 11, 2024

Related U.S. Application Data

(63) Continuation of application No. PCT/JP2022/017223, filed on Apr. 7, 2022.

(30) Foreign Application Priority Data

Jun. 18, 2021 (JP) .................. 2021-101324

(51) Int. Cl.
  *G10L 19/032* (2013.01)
(52) U.S. Cl.
  CPC ................... *G10L 19/032* (2013.01)
(58) Field of Classification Search
  CPC .................................................... G10L 19/032
  See application file for complete search history.

(56) References Cited

U.S. PATENT DOCUMENTS

| | | | |
|---|---|---|---|
| 6,697,688 B1* | 2/2004 | Kuwaoka | G11B 20/10527 |
| | | | 341/143 |
| 2008/0186218 A1* | 8/2008 | Ohkuri | G10L 21/0208 |
| | | | 341/143 |

(Continued)

FOREIGN PATENT DOCUMENTS

| | | | |
|---|---|---|---|
| EP | 2372712 A2 * | 10/2011 | H04B 14/046 |
| JP | 2004180017 A | 6/2004 | |
| JP | 2011180479 | * 9/2011 | |

*Primary Examiner* — Shaun Roberts
(74) *Attorney, Agent, or Firm* — Nath, Goldberg & Meyer; Jerald L. Meyer; Stanley N. Protigal

(57) ABSTRACT

A framing processing unit converts a first digital music signal quantized with a first number of quantization bits, into frames. A difference signal calculation unit calculates a first difference signal in which a difference sample is a difference value between two adjacent samples. A flat area detection unit detects a flat area in the first difference signal. A flat area correction unit generate a second difference signal in which the flat area is altered to not be flat. A difference signal averaging unit calculates a difference average value and subtracts the difference average value from each sample value of the second difference signal to generate a third difference signal. A requantization error generation unit generates a requantization error signal. An addition unit adds the requantization error signal to the first digital music signal and outputs a second digital music signal having a second number of quantization bits.

3 Claims, 25 Drawing Sheets

(56) References Cited

U.S. PATENT DOCUMENTS

| | | | |
|---|---|---|---|
| 2010/0262639 A1* | 10/2010 | Suzuki | G11B 20/10527 |
| | | | 708/700 |
| 2010/0318205 A1* | 12/2010 | Ohkuri | H04R 3/002 |
| | | | 700/94 |
| 2011/0144781 A1* | 6/2011 | Iwata | H03M 7/302 |
| | | | 700/94 |
| 2018/0220249 A1* | 8/2018 | Aoki | H04R 27/00 |
| 2021/0174814 A1* | 6/2021 | Suyama | H04S 1/007 |

* cited by examiner

| SAMPLE NUMBER | DIFFERENCE VALUE BEFORE CORRECTION | DIFFERENCE VALUE AFTER CORRECTION | CORRECTION VALUE |
|---|---|---|---|
| 73 | 2 | 2 | 0 |
| 74 | 3 | 3.5 | 0.5 |
| 75 | 3 | 2.5 | −0.5 |
| 76 | 2 | 2 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 998 | 0 | 0 | 0 |
| 999 | 3 | 2.5 | −0.5 |
| 1000 | 3 | 3.5 | 0.5 |
| 1001 | 4 | 4 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 167 | 3 | 3 | 0 |
| 168 | 2 | 1.5 | −0.5 |
| 169 | 2 | 2.5 | 0.5 |
| 170 | 4 | 4 | 0 |

FALLING-FLAT-RISING PATTERN

| SAMPLE NUMBER | DIFFERENCE VALUE BEFORE CORRECTION | DIFFERENCE VALUE AFTER CORRECTION | CORRECTION VALUE |
|---|---|---|---|
| 573 | 0 | 0 | 0 |
| 574 | −2 | −2 | 0 |
| 575 | −2 | −2.5 | −0.5 |
| 576 | −4 | −4 | 0 |

FALLING-FLAT-FALLING PATTERN

| SAMPLE NUMBER | DIFFERENCE VALUE BEFORE CORRECTION | DIFFERENCE VALUE AFTER CORRECTION | CORRECTION VALUE |
|---|---|---|---|
| 590 | −3 | −3 | 0 |
| 591 | −2 | −2 | 0 |
| 592 | −2 | −1.5 | 0.5 |
| 593 | −2 | −2.5 | −0.5 |
| 594 | −3 | −3 | 0 |

RISING-FLAT-FALLING PATTERN

| SAMPLE NUMBER | DIFFERENCE VALUE BEFORE CORRECTION | DIFFERENCE VALUE AFTER CORRECTION | CORRECTION VALUE |
|---|---|---|---|
| 492 | −7 | −7 | 0 |
| 493 | −6 | −6 | 0 |
| 494 | −6 | −6.5 | −0.5 |
| 495 | −6 | −5.5 | 0.5 |
| 496 | −5 | −5 | 0 |

RISING-FLAT-RISING PATTERN

| SAMPLE NUMBER | DIFFERENCE VALUE BEFORE CORRECTION | DIFFERENCE VALUE AFTER CORRECTION | CORRECTION VALUE |
|---|---|---|---|
| 313 | 9 | 9 | 0 |
| 314 | 8 | 7.5 | −0.5 |
| 315 | 8 | 8 | 0 |
| 316 | 8 | 8.5 | 0.5 |
| 317 | 9 | 9 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 134 | 4 | 4 | 0 |
| 135 | 3 | 3.5 | 0.5 |
| 136 | 3 | 3 | 0 |
| 137 | 3 | 2.5 | −0.5 |
| 138 | 2 | 2 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 821 | 7 | 7 | 0 |
| 822 | 8 | 8 | 0 |
| 823 | 8 | 7.5 | −0.5 |
| 824 | 8 | 8.5 | 0.5 |
| 825 | 8 | 7.5 | −0.5 |
| 826 | 7 | 7 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 654 | 7 | 7 | 0 |
| 655 | 9 | 8.5 | −0.5 |
| 656 | 9 | 9 | 0 |
| 657 | 9 | 8.5 | −0.5 |
| 658 | 9 | 9.5 | 0.5 |
| 659 | 11 | 11 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 252 | 12 | 12 | 0 |
| 253 | 11 | 10.5 | −0.5 |
| 254 | 11 | 11 | 0 |
| 255 | 11 | 10.5 | −0.5 |
| 256 | 11 | 11.5 | 0.5 |
| 257 | 12 | 12 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 341 | 12 | 12 | 0 |
| 342 | 11 | 11 | 0 |
| 343 | 11 | 11.5 | 0.5 |
| 344 | 11 | 11 | 0 |
| 345 | 11 | 10.5 | −0.5 |
| 346 | 10 | 10 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 281 | -7 | -7 | 0 |
| 282 | -6 | -6 | 0 |
| 283 | -6 | -6.5 | -0.5 |
| 284 | -6 | -6 | 0 |
| 285 | -6 | -5.5 | 0.5 |
| 286 | -6 | -6 | 0 |
| 287 | -7 | -7 | 0 |

RISING-FLAT-FALLING PATTERN

| SAMPLE NUMBER | DIFFERENCE VALUE BEFORE CORRECTION | DIFFERENCE VALUE AFTER CORRECTION | CORRECTION VALUE |
|---|---|---|---|
| 617 | −5 | −5 | 0 |
| 618 | −6 | −6 | 0 |
| 619 | −6 | −5.5 | 0.5 |
| 620 | −6 | −6 | 0 |
| 621 | −6 | −6.5 | −0.5 |
| 622 | −6 | −6 | 0 |
| 623 | −5 | −5 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 573 | 0 | 0 | 0 |
| 574 | -2 | -1.5 | 0.5 |
| 575 | -2 | -2.5 | -0.5 |
| 576 | -4 | -4 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 590 | -3 | -3 | 0 |
| 591 | -2 | -1.5 | 0.5 |
| 592 | -2 | -2 | 0 |
| 593 | -2 | -2.5 | -0.5 |
| 594 | -3 | -3 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 492 | -7 | -7 | 0 |
| 493 | -6 | -6.5 | -0.5 |
| 494 | -6 | -6 | 0 |
| 495 | -6 | -5.5 | 0.5 |
| 496 | -5 | -5 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 821 | 7 | 7 | 0 |
| 822 | 8 | 8.5 | 0.5 |
| 823 | 8 | 8.25 | 0.25 |
| 824 | 8 | 7.75 | −0.25 |
| 825 | 8 | 7.5 | −0.5 |
| 826 | 7 | 7 | 0 |

RISING-FLAT-FALLING PATTERN

| SAMPLE NUMBER | DIFFERENCE VALUE BEFORE CORRECTION | DIFFERENCE VALUE AFTER CORRECTION | CORRECTION VALUE |
|---|---|---|---|
| 654 | 7 | 7 | 0 |
| 655 | 9 | 8.5 | −0.5 |
| 656 | 9 | 8.75 | −0.25 |
| 657 | 9 | 9.25 | 0.25 |
| 658 | 9 | 9.5 | 0.5 |
| 659 | 11 | 11 | 0 |

RISING-FLAT-RISING PATTERN

| SAMPLE NUMBER | DIFFERENCE VALUE BEFORE CORRECTION | DIFFERENCE VALUE AFTER CORRECTION | CORRECTION VALUE |
|---|---|---|---|
| 252 | 12 | 12 | 0 |
| 253 | 11 | 10.5 | −0.5 |
| 254 | 11 | 10.75 | −0.25 |
| 255 | 11 | 11.25 | 0.25 |
| 256 | 11 | 11.5 | 0.5 |
| 257 | 12 | 12 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 341 | 12 | 12 | 0 |
| 342 | 11 | 11.5 | 0.5 |
| 343 | 11 | 11.25 | 0.25 |
| 344 | 11 | 10.75 | −0.25 |
| 345 | 11 | 10.5 | −0.5 |
| 346 | 10 | 10 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 281 | -7 | -7 | 0 |
| 282 | -6 | -5.5 | 0.5 |
| 283 | -6 | -5.75 | 0.25 |
| 284 | -6 | -6 | 0 |
| 285 | -6 | -6.25 | -0.25 |
| 286 | -6 | -6.5 | -0.5 |
| 287 | -7 | -7 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 617 | −5 | −5 | 0 |
| 618 | −6 | −6.5 | −0.5 |
| 619 | −6 | −6.25 | −0.25 |
| 620 | −6 | −6 | 0 |
| 621 | −6 | −5.75 | 0.25 |
| 622 | −6 | −5.5 | 0.5 |
| 623 | −5 | −5 | 0 |

| SAMPLE NUMBER | DIFFERENCE VALUE BEFORE CORRECTION | DIFFERENCE VALUE AFTER CORRECTION | CORRECTION VALUE |
|---|---|---|---|
| 874 | −5 | −5 | 0 |
| 875 | −6 | −5.5 | 0.5 |
| 876 | −6 | −5.75 | 0.25 |
| 877 | −6 | −6 | 0 |
| 878 | −6 | −6.25 | −0.25 |
| 879 | −6 | −6.5 | −0.5 |
| 880 | −7 | −7 | 0 |

BIT EXTENSION PROCESSING APPARATUS, BIT EXTENSION PROCESSING METHOD, AND BIT EXTENSION PROCESSING PROGRAM STORED IN A NON-TRANSITORY STORAGE MEDIUM

CROSS-REFERENCE TO RELATED APPLICATIONS

This application is a continuation of PCT Application No. PCT/JP2022/017223, filed on Apr. 7, 2022, and claims the priority of Japanese Patent Application No. 2021-101324, filed on Jun. 18, 2021, the entire contents of both of which are incorporated herein by reference.

BACKGROUND

The present disclosure relates to a bit extension processing apparatus, a bit extension processing method, and a bit extension processing program for extending the number of quantization bits of a digital music signal.

Assuming that m and n are positive integers and n>m holds, m quantization bits of a digital music signal may be extended to n bits by using a bit extension processing apparatus. A bit extension processing apparatus employing a simple bit extension processing method generates a digital music signal having n bits by adding (n−m) bits of zero data to lower-order bits of an m-bit digital music signal. Generally, a bit extension processing tool installed in audio editing software employs this kind of simple bit extension processing method.

SUMMARY

Japanese Unexamined Patent Application Publication No. 2004-180017 (Patent Literature 1) discloses an improved bit extension processing program. According to the bit extension processing program disclosed in Patent Literature 1, if bit extension processing is performed on a digital music signal of a calm musical piece having consecutive identical sample values, it is possible to improve the quality (sound quality) of the bit extension processing. However, if the processing is performed on a digital music signal of a musical piece having sharply changing sample values, it is not possible to improve the quality much.

A first aspect of one or more embodiments provides a bit extension processing apparatus including a framing processing unit, a difference signal calculation unit, a flat area detection unit, a flat area correction unit, a difference signal averaging unit, a requantization error generation unit, and an addition unit.

A framing processing unit is configured to convert samples of a first digital music signal quantized with a first number of quantization bits, into frames, by dividing the samples at each number of a plurality of samples. A difference signal calculation unit is configured to calculate a first difference signal in which a difference sample is a difference value between two adjacent samples of the first digital music signal in each frame.

A flat area detection unit is configured to detect a start position, an end position, and the number of difference samples of a flat area where two or more difference samples having the same sample value in the first difference signal are continuous.

A flat area correction unit is configured to set one or more difference samples out of the difference samples of the flat area as a difference sample to be corrected, to correct a value of the sample to be corrected by adding or subtracting a correction value to or from the value of the sample to be corrected, and to generate a second difference signal in which the flat area is altered to not be flat according to a pattern in which a sample value rises or falls from a difference sample immediately preceding the flat area to a difference sample at the start position, and a pattern in which a sample value rises or falls from a difference sample at the end position to a difference sample immediately subsequent to the flat area.

A difference signal averaging unit is configured to sum sample values of the second difference signal in each frame and divides the sample values by the number of samples of the second difference signal in each frame to calculate a difference average value, and to subtract the difference average value from each of the sample values of the second difference signal to generate a third difference signal.

A requantization error generation unit is configured to generate, based on the third difference signal, a requantization error signal in each frame expressed by the number of bits of a difference between the first number of quantization bits and a second number of quantization bits larger than the first number of quantization bits. An addition unit is configured to add the requantization error signal to the first digital music signal in each frame and outputs a second digital music signal having the second number of quantization bits.

A second aspect of one or more embodiments provides a bit extension processing method for performing the following processing. The bit extension processing method includes: converting samples of a first digital music signal quantized with a first number of quantization bits, into frames by dividing the samples at each number of a plurality of samples; calculating a first difference signal in which a difference sample is a difference value between two adjacent samples of the first digital music signal in each frame; and detecting a start position, an end position, and the number of difference samples of a flat area where two or more difference samples having the same sample value in the first difference signal are continuous.

The bit extension processing method includes setting one or more difference samples out of the difference samples of the flat area as a difference sample to be corrected, correcting a value of the sample to be corrected by adding or subtracting a correction value to or from the value of the sample to be corrected, and generating a second difference signal in which the flat area is altered to not be flat according to a pattern in which a sample value rises or falls from a difference sample immediately preceding the flat area to a difference sample at the start position, and a pattern in which a sample value rises or falls from a difference sample at the end position to a difference sample immediately subsequent to the flat area.

The bit extension processing method includes: summing sample values of the second difference signal in each frame and dividing the sample values by the number of samples of the second difference signal in each frame to calculate a difference average value, and subtracting the difference average value from each of the sample values of the second difference signal to generate a third difference signal.

The bit extension processing method includes: generating, based on the third difference signal, a requantization error signal in each frame expressed by the number of bits of a difference between the first number of quantization bits and a second number of quantization bits larger than the first number of quantization bits; and adding the requantization error signal to the first digital music signal in each frame and generating a second digital music signal having the second number of quantization bits.

A third aspect of one or more embodiments provides a bit extension processing program stored in a non-transitory storage medium for causing a computer to execute the following steps. The bit extension processing program causes a computer to execute the steps of: converting samples of a first digital music signal quantized with a first number of quantization bits, into frames, by dividing the samples at each number of a plurality of samples; calculating a first difference signal in which a difference sample is a difference value between two adjacent samples of the first digital music signal in each frame; and detecting a start position, an end position, and the number of difference samples of a flat area where two or more difference samples having the same sample value in the first difference signal are continuous.

The bit extension processing program causes a computer to execute a step of setting one or more difference samples out of the difference samples of the flat area as a difference sample to be corrected, correcting a value of the sample to be corrected by adding or subtracting a correction value to or from the value of the sample to be corrected, and generating a second difference signal in which the flat area is altered to not be flat, according to a pattern in which a sample value rises or falls from a difference sample immediately preceding the flat area to a difference sample at the start position, and a pattern in which a sample value rises or falls from a difference sample at the end position to a difference sample immediately subsequent to the flat area.

The bit extension processing program causes a computer to execute the steps of: summing sample values of the second difference signal in each frame and dividing the sample values by the number of samples of the second difference signal in each frame to calculate a difference average value, and subtracting the difference average value from each of the sample values of the second difference signal to generate a third difference signal.

The bit extension processing program causes a computer to execute the steps of: generating, based on the third difference signal, a requantization error signal in each frame expressed by the number of bits of a difference between the first number of quantization bits and a second number of quantization bits larger than the first number of quantization bits; and adding the requantization error signal to the first digital music signal in each frame and generating a second digital music signal having the second number of quantization bits.

DETAILED DESCRIPTION

A bit extension processing apparatus, a bit extension processing method, and a bit extension processing program according to one or more embodiments will be described below with reference to the accompanying drawings.

Figure 1:
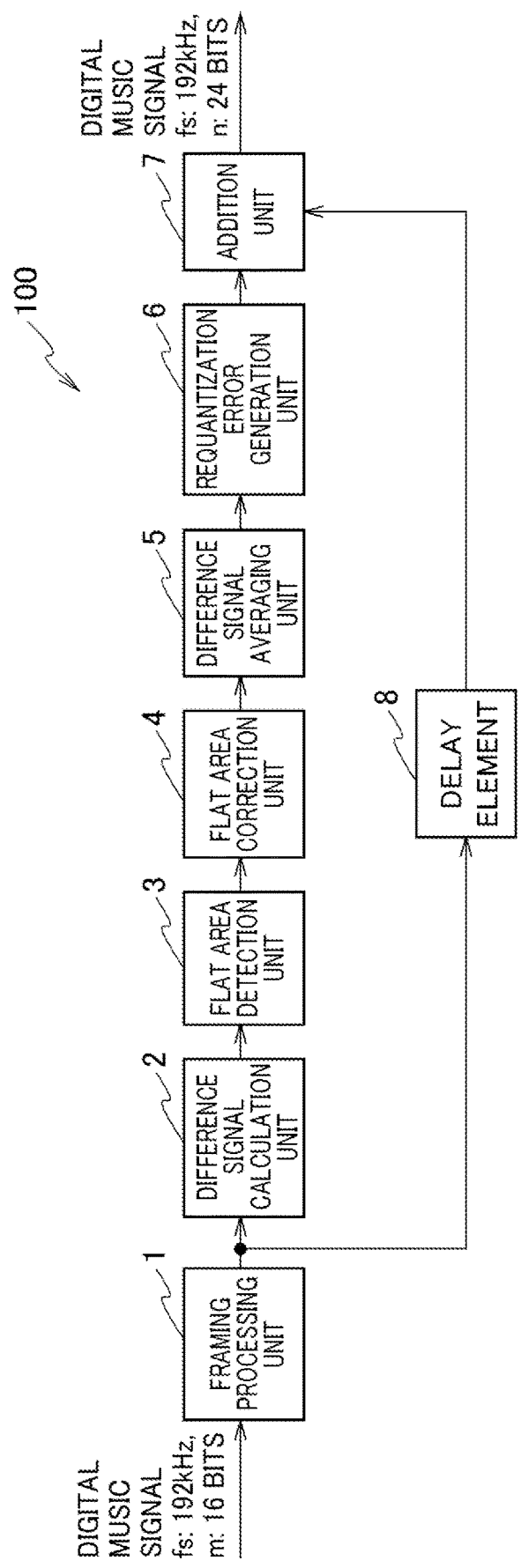
FIG. 1 is a block diagram illustrating a bit extension processing apparatus according to one or more embodiments.

Assuming that m and n are positive integers and n>m holds, a bit extension processing apparatus 100 according to one or more embodiments shown in FIG. 1 performs bit extension processing on a digital music signal which has been quantized with the number of input quantization bits being m bits (first number of quantization bits) and outputs a digital music signal in which the number of quantization bits is n (second number of quantization bits). As an example, the sampling frequency (fs) of the input digital music signal is 192 kHz and the number of quantization bits is 16, and the sampling frequency of the output digital music signal is 192 kHz and the number of quantization bits is 24.

The bit extension processing apparatus 100 includes a framing processing unit 1, a difference signal calculation unit 2, a flat area detection unit 3, a flat area correction unit 4, a difference signal averaging unit 5, a requantization error generation unit 6, an addition unit 7, and a delay element 8.

The framing processing unit 1 converts sequentially input samples in a digital music signal into frames by dividing the samples at predetermined time intervals (that is, the samples are divided at each predetermined number of multiple samples). As an example, the framing processing unit 1 divides a series of input samples of a digital music signal at each 128 samples to form single frames including 128 samples. The difference signal calculation unit 2 calculates a difference signal (a first difference signal) in which a sample is a difference value between the current sample and an immediately preceding sample of the sequentially input samples in each frame. In order to distinguish the input samples of the digital music signal from the sample of the difference signal, the sample of the difference signal will be referred to as a difference sample.

Figure 2:
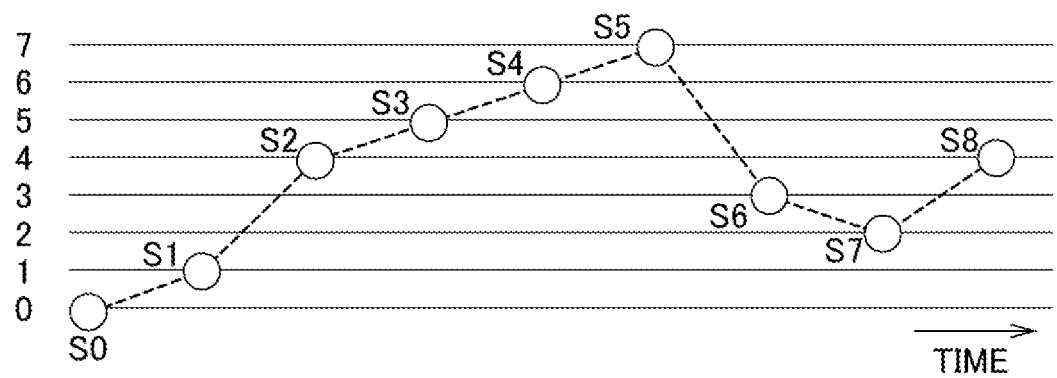
FIG. 2 is a diagram schematically illustrating operations of a difference signal calculation unit and a flat area detection unit in the bit extension processing apparatus according to one or more embodiments.
Figure 2:
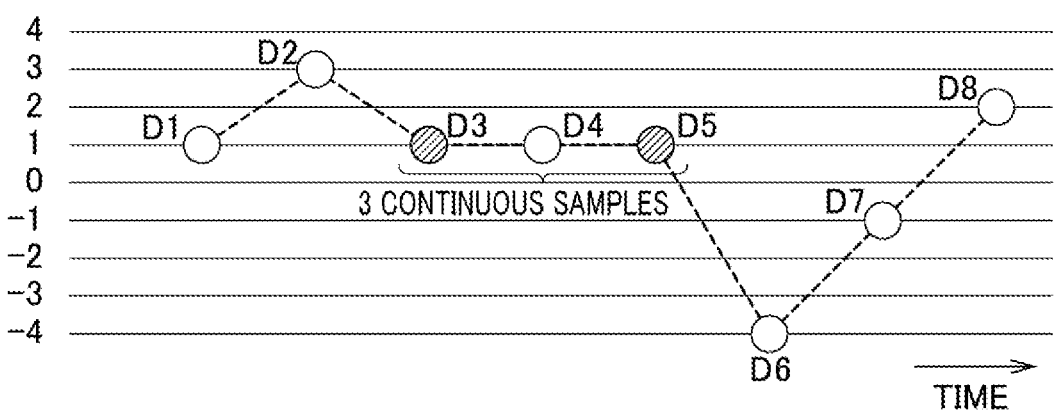

The operations of the difference signal calculation unit 2 and the flat area detection unit 3 will be described in detail with reference to FIG. 2. In FIG. 2, (a) shows an example of a change in values of samples S0 to S8 of a digital music signal supplied from the framing processing unit 1 to the difference signal calculation unit 2. The values of the samples S0 to S8 are 0, 1, 4, 5, 6, 7, 3, 2, and 4, respectively.

As shown in (b) of FIG. 2, when each of samples S1 to S8 is the current sample, immediately preceding samples are S0 to S7, respectively, and the difference signal calculation unit 2 obtains a difference value between the current sample and the immediately preceding sample. In the waveform shown in (a) of FIG. 2, difference values 1, 3, 1, 1, 1, −4, −1, and 2 corresponding to the samples S1 to S8, respectively, are obtained. (c) of FIG. 2 shows a difference signal based on the difference values shown in (b) of FIG. 2. The difference signal calculated by the difference signal calculation unit 2 is a number sequence of the difference values obtained corresponding to each sample. The difference signal shown in (c) of FIG. 2 includes difference samples D1 to D8.

If the sample S0 is the first sample in a frame, there is no sample immediately preceding the sample S0. As described later, a difference signal calculated by the difference signal calculation unit 2 is supplied to the flat area detection unit 3, and the flat area detection unit 3 detects a flat area in which difference values in a difference signal (sample values of a difference sample) are the same value. If, at the time of the sample S0, the difference signal calculation unit 2 erroneously outputs a difference value which is the same as a difference value obtained at the time of the sample S1, the flat area detection unit 3 erroneously detects a flat area. Therefore, at the time of the first sample S0, it is preferable that the difference signal calculation unit 2 output, as a difference value, an extremely large value that is unlikely to occur at the time of the sample S1 and thereafter.

The difference signal calculation unit 2 may calculate a difference value at the time of the sample S1 and thereafter without calculating a difference value at the time of the first sample S0. In one or more embodiments, as shown in (c) of FIG. 2, the difference signal calculation unit 2 outputs a difference signal formed by difference samples at the time of the sample S1 and thereafter.

A difference signal calculated by the difference signal calculation unit 2 is supplied to the flat area detection unit 3. The flat area detection unit 3 detects start and end positions of a flat area in which two or more difference values having the same value in the difference signal are continuous, and the number of samples of the flat area (number of consecutive identical value). In the example shown in (c) of FIG. 2, the flat area detection unit 3 detects that the difference sample D3 is a start position of a flat area, the difference sample D5 is an end position of the flat area, and the number of samples of the flat area is 3.

Figure 3:
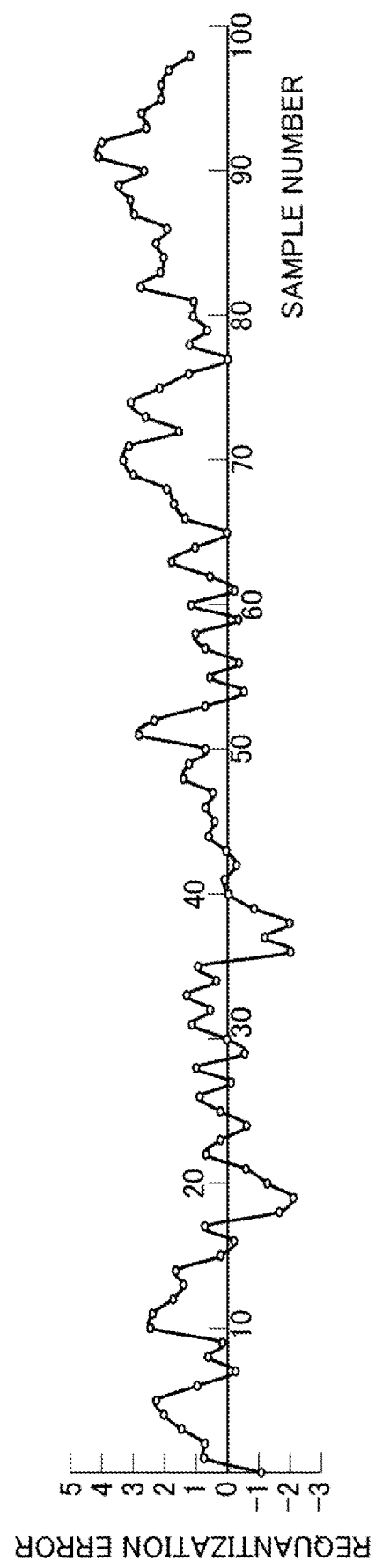
FIG. 3 is a waveform diagram illustrating a requantization error signal from two digital music signals recorded by quantizing in two formats of 24 quantization bits and 16 quantization bits.

FIG. 3 shows a requantization error signal obtained from two digital music signals. The two digital music signals are obtained by quantizing one performance of a predetermined musical piece with two formats in which the number of quantization bits is 16 and the number of quantization bits is 24 and by recording the performance at a sampling frequency of 192 kHz at the same time using the same equipment. The requantization error signal shown in FIG. 3 is calculated as follows.

To compare a first digital music signal in which the number of quantization bits is 16 with a second digital music signal in which the number of quantization bits is 24, the second digital music signal is multiplied by $1/256$, and the lower 8 bits of the second digital music signal are expressed using decimal points. Leading positions of the first digital music signal and the second digital music signal of which the lower 8 bits are expressed using decimal points are aligned, and a difference value between sample values of the first digital music signal and the second digital music signal is calculated as a requantization error for each sample.

Assuming that the first digital music signal in which the number of quantization bits is 16 is M1, the second digital music signal in which the number of quantization bits is 24 is M2, the requantization error signal is ERROR (a decimal value), and i is a sample number, a requantization error signal ERROR[i] at each sample number is expressed by formula (1). Rewriting formula (1) results in formulas (2) and (3). In formula (3), ROUND indicates rounding off of the numerical value after the decimal point.

$$ERROR[i]=M2[i]/256-M1[i] \quad (1)$$

$$M2[i]/256=M1[i]+ERROR[i] \quad (2)$$

$$M2[i]=ROUND[(M1[i]*256)+(ERROR[i]*256)] \quad (3)$$

It can be seen from formula (3) that, if the requantization error signal is added to the first digital music signal M1 quantized with 16 quantization bits, it is possible to reproduce the second digital music signal M2 in which the number of quantization bits is 24. Here, a coefficient for dividing M2 in formula (1) is determined according to the value of (n–m), which is the difference between the number of quantization bits of both signals.

Figure 4:
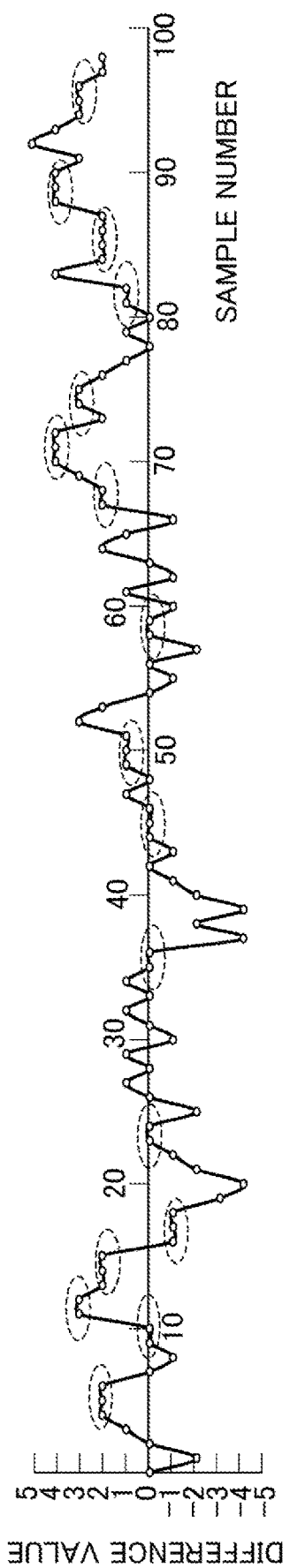
FIG. 4 is a waveform diagram illustrating difference values between two adjacent samples of a digital music signal in which the number of quantization bits is 16.

FIG. 4 shows difference values between two adjacent samples in the first digital music signal M1. If DIFF(M1)[i] is a difference value between the current sample pcm[i] and a immediately preceding sample pcm[i-1] which are adjacent to each other in the first digital music signal M1, DIFF(M1) [i] is expressed by formula (4).

$$DIFF(M1)[i]=pcm[i]-pcm[i-1] \quad (4)$$

Comparing FIGS. 3 and 4, it can be seen that there is a high correlation between the requantization error signal of the first digital music signal M1 and the second digital music signal M2 and the difference values of two adjacent samples in the first digital music signal M1. However, the requantization error signal of FIG. 3 does not have flat waveform parts with consecutive identical difference values, surrounded by dashed ellipses in FIG. 4. If the flat waveform parts surrounded by the dashed ellipses are corrected so as to approximate the waveform of the requantization error signal, it is possible to further enhance the correlation between the requantization error signal and the difference values.

Returning to FIG. 1, the flat area correction unit 4 is supplied with the difference signal calculated by the difference signal calculation unit 2, and the start and end positions and the number of samples of the flat area detected by the flat area detection unit 3. The flat area correction unit 4 corrects the flat area of the difference signal such that the waveform of the difference signal approximates the waveform of the requantization error signal.

With reference to FIGS. 5A to 5D, 6A to 6D, 7A to 7D, and 8A to 8D, a description will be given regarding a first example of a method of correcting a flat area by the flat area correction unit 4 when the number of samples in the flat area is 2 to 5. In each diagram, dashed circles indicate difference samples before correction, and solid circles indicate difference samples after correction. FIGS. 5A to 5D, 6A to 6D, 7A to 7D, and 8A to 8D show sample numbers of portions where flat areas having 2 to 5 samples have actually occurred when a digital music signal of a predetermined musical piece was input to the bit extension processing apparatus 100.

Figure 5A:
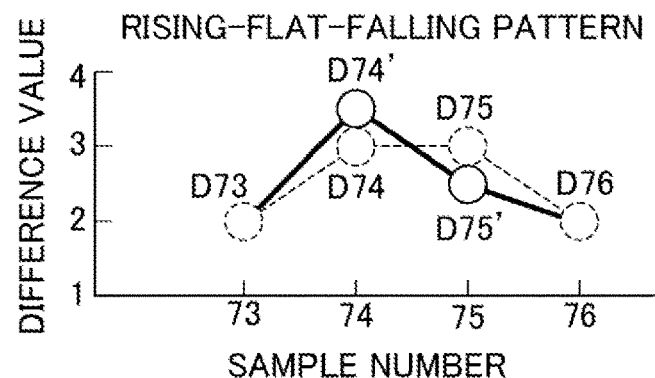
FIG. 5A is a diagram illustrating a rising-flat-falling pattern in which a flat area has two samples, and a first example of a method of correcting the flat area in this case.

In the difference signal shown in FIG. 5A, two difference samples D74 and D75 respectively having the numbers 74 and 75 form a flat area. FIG. 5A shows a pattern in which the difference value rises from a difference sample D73 having sample number 73 immediately preceding the flat area to the difference sample D74, is and falls from the difference sample D75 to a difference sample D76 having sample number 76 immediately subsequent to the flat area. The pattern in which the difference value rises before the flat area and falls after the flat area will be referred to as a rising-flat-falling pattern. The difference values before correction of the difference samples D73 to D76 are 2, 3, 3, and 2, respectively.

The flat area correction unit 4 adds a correction value 0.5 to the difference sample D74 to correct the difference value to 3.5, and subtracts a correction value 0.5 from the difference sample D75 to correct the difference value to 2.5. In FIG. 5A, the difference samples D74 and D75 are difference samples to be corrected. The difference sample D74 is corrected to a corrected difference sample D74' having a difference value larger than that of the difference sample D74. The difference sample D75 is corrected to a corrected difference sample D75' having a difference value between the difference sample D75 and the difference sample D76.

The addition of the correction value 0.5 corresponds to adding a decimal part assuming that the current difference sample is a value to be incremented to the positive side. The subtraction of the correction value 0.5 corresponds to adding a decimal part assuming that the current difference sample is a value to be decremented to the negative side.

In this way, the flat area correction unit 4 alters the flat area having two samples of the difference signal having the rising-flat-falling pattern to not be flat.

Figure 5B:
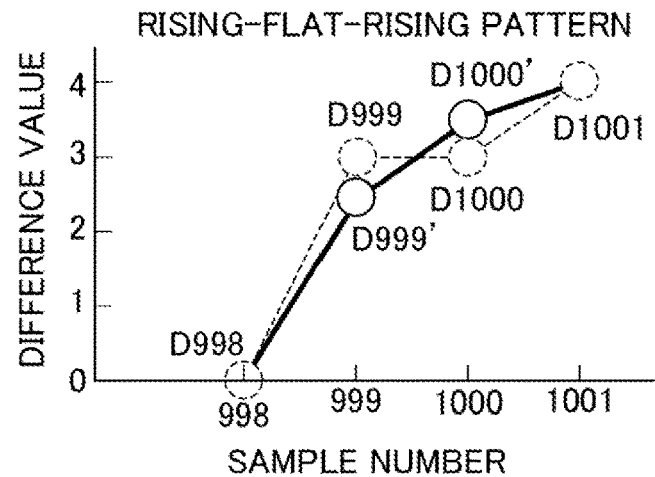
FIG. 5B is a diagram illustrating a rising-flat-rising pattern in which a flat area has two samples, and a first example of a method of correcting the flat area in this case.

In a difference signal shown in FIG. 5B, two difference samples D999 and D1000 respectively having the numbers 999 and 1000 form a flat area. FIG. 5B shows a pattern in which the difference value rises from a difference sample D998 having a sample number 998 immediately preceding the flat area to the difference sample D999, and the difference value rises from the difference sample D1000 to a difference sample D1001 having a sample number 1001 immediately subsequent to the flat area. The pattern in which the difference value rises before the flat area and the difference value rises after the flat area will be referred to as a rising-flat-rising pattern. The difference values before correction of the difference samples D998 to D1001 are 0, 3, 3, and 4, respectively.

The flat area correction unit 4 subtracts a correction value 0.5 from the difference sample D999 to correct the difference value to 2.5, and adds a correction value 0.5 to the difference sample D1000 to correct the difference value to 3.5.

In FIG. 5B, the difference samples D999 and D1000 are difference samples to be corrected. The difference sample D999 is corrected to a corrected difference sample D999' having a difference value between the difference sample D998 and the difference sample D999. The difference sample D1000 is corrected to a corrected difference sample D1000' having a difference value between the difference sample D1000 and the difference sample D1001.

In this way, the flat area correction unit 4 alters the flat area having 2 samples of the difference signal having the rising-flat-rising pattern to not be flat.

Figure 5C:
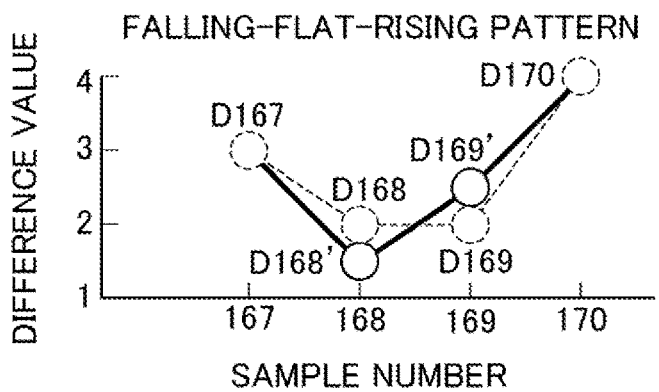
FIG. 5C is a diagram illustrating a falling-flat-rising pattern in which a flat area has two samples, and a first example of a method of correcting the flat area in this case.

In a difference signal shown in FIG. 5C, two difference samples D168 and D169 respectively having the numbers 168 and 169 form a flat area. FIG. 5C shows a pattern in which a difference value falls from a difference sample D167 having a sample number 167 immediately preceding the flat area to the difference sample D168, and the difference value rises from the difference sample D169 to a difference sample D170 having a sample number 170 immediately subsequent to the flat area. The pattern in which the difference value falls before the flat area and rises after the flat area will be referred to as a falling-flat-rising pattern. Difference values before correction of the difference samples D167 to D170 are 3, 2, 2, and 4, respectively.

The flat area correction unit 4 subtracts a correction value 0.5 from the difference sample D168 to correct the difference value to 1.5, and adds a correction value 0.5 to the difference sample D169 to correct the difference value to 2.5. In FIG. 5C, the difference samples D168 and D169 are difference samples to be corrected. The difference sample D168 is corrected to a corrected difference sample D168' having a difference value smaller than that of the difference sample D168. The difference sample D169 is corrected to a corrected difference sample D169' having a difference value between the difference sample D169 and the difference sample D170.

In this way, the flat area correction unit 4 alters the flat area having 2 samples of the difference signal having the falling-flat-rising pattern to not be flat.

Figure 5D:
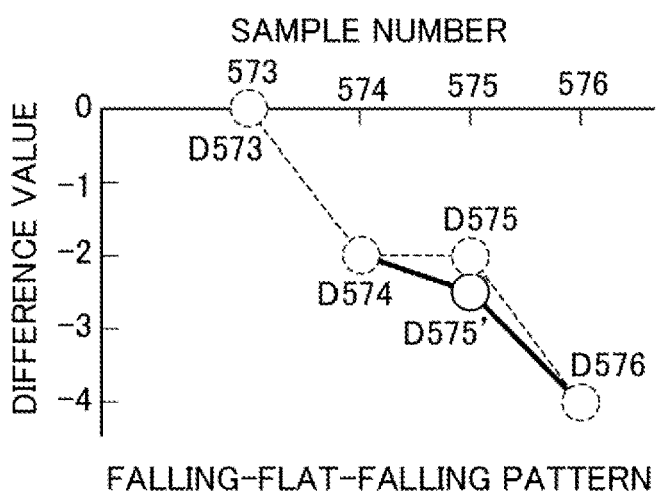
FIG. 5D is a diagram illustrating a falling-flat-falling pattern in which a flat area has two samples, and a first example of a method of correcting the flat area in this case.

In a difference signal shown in FIG. 5D, two difference samples D574 and D575 respectively having the numbers 574 and 575 form a flat area. FIG. 5D shows a pattern in which a difference value falls from a difference sample D573 having a sample number 573 immediately preceding the flat area to the difference sample D574, and the difference value falls from the difference sample D575 to a difference sample D576 having a sample number 576 immediately subsequent to the flat area. The pattern in which the difference value falls before the flat area and the difference value falls after the flat area will be referred to as a falling-flat-falling pattern. Difference values before correction of the difference samples D573 to D576 are 0, −2, −2, and −4, respectively.

The flat area correction unit 4 subtracts a correction value 0.5 from the difference sample D575 to correct the difference value to −2.5. In FIG. 5D, the difference sample D575 is a difference sample to be corrected. The difference sample D575 is corrected to a corrected difference sample D575' having a difference value between the difference sample D575 and the difference sample D576.

In this way, the flat area correction unit 4 alters the flat area having 2 samples of the difference signal having the falling-flat-falling pattern to not be flat.

Figure 6A:
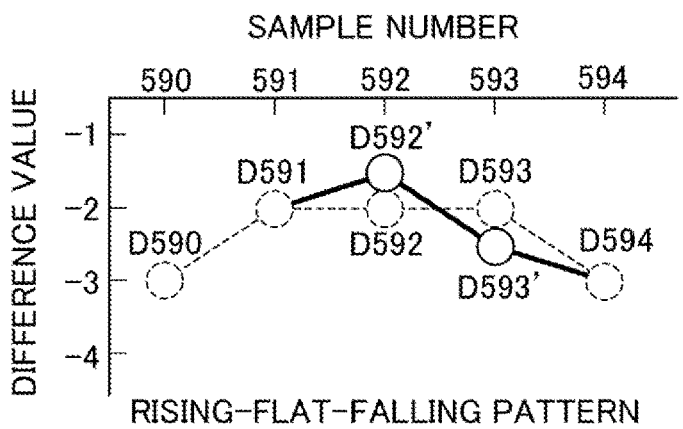
FIG. 6A is a diagram illustrating a rising-flat-falling pattern in which a flat area has three samples, and a first example of a method of correcting the flat area in this case.

In a difference signal shown in FIG. 6A, three difference samples D591 to D593 respectively having the numbers 591 to 593 form a flat area. FIG. 6A shows a rising-flat-falling pattern in which a difference value rises from a difference sample D590 having a sample number 590 immediately preceding the flat area to the difference sample D591, and the difference value falls from the difference sample D593 to a difference sample D594 having a sample number 594 immediately subsequent to the flat area. Difference values before correction of the difference samples D590 to D594 are −3, −2, −2, −2, and −3, respectively.

The flat area correction unit 4 adds a correction value 0.5 to the difference sample D592 to correct the difference value to −1.5, and subtracts a correction value 0.5 from the difference sample D593 to correct the difference value to −2.5. In FIG. 6A, the difference samples D592 and D593 are difference samples to be corrected. The difference sample D592 is corrected to a corrected difference sample D592' having a difference value larger than that of the difference sample D592. The difference sample D593 is corrected to a corrected difference sample D593' having a difference value between the difference sample D593 and the difference sample D594.

In this way, the flat area correction unit 4 alters the flat area having 3 samples of the difference signal having the rising-flat-falling pattern to not be flat.

Figure 6B:
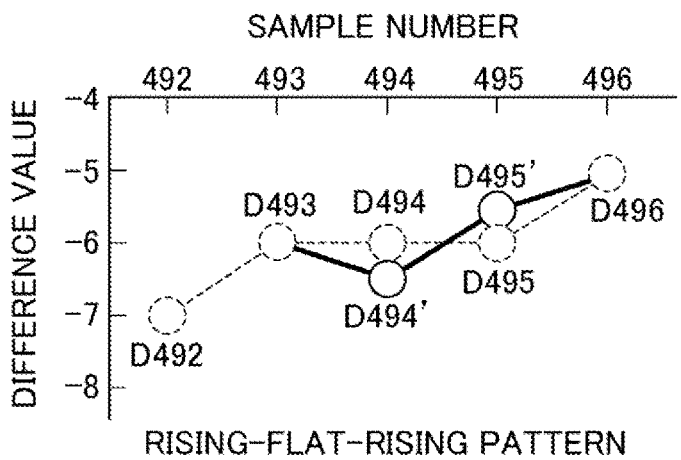
FIG. 6B is a diagram illustrating a rising-flat-rising pattern in which a flat area has three samples, and a first example of a method of correcting the flat area in this case.

In a difference signal shown in FIG. 6B, three difference samples D493 to D495 respectively having the numbers 493 to 495 form a flat area. FIG. 6B shows a rising-flat-rising pattern in which a difference value rises from a difference sample D492 having a sample number 492 immediately preceding the flat area to the difference sample D493, and the difference value rises from the difference sample D495 to a difference sample D496 having a sample number 496 immediately subsequent to the flat area. Difference values before correction of the difference samples D492 to D496 are −7, −6, −6, −6, and −5, respectively.

The flat area correction unit 4 subtracts a correction value 0.5 from the difference sample D494 to correct a difference value to −6.5, and adds a correction value 0.5 to the difference sample D495 to correct a difference value to −5.5. In FIG. 6B, the difference samples D494 and D495 are difference samples to be corrected. The difference sample D494 is corrected to a corrected difference sample D494' having a difference value between the difference sample D492 and the difference sample D494. The difference sample D495 is corrected to a corrected difference sample D495' having a difference value between the difference sample D495 and the difference sample D496.

In this way, the flat area correction unit 4 alters the flat area having 3 samples of the difference signal having the rising-flat-rising pattern to not be flat.

Figure 6C:
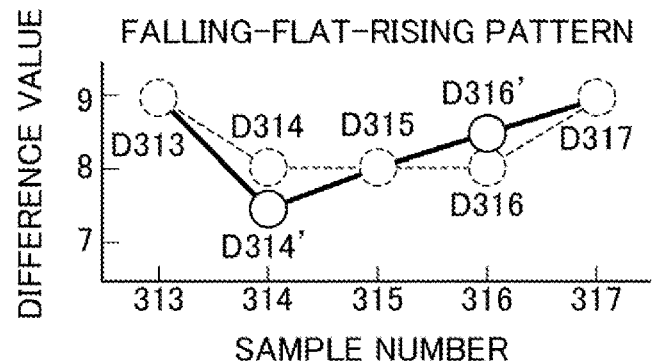
FIG. 6C is a diagram illustrating a falling-flat-rising pattern in which a flat area has three samples, and a first example of a method of correcting the flat area in this case.

In a difference signal shown in FIG. 6C, three difference samples D314 to D316 respectively having the numbers 314 to 316 form a flat area. FIG. 6C shows a falling-flat-rising pattern in which a difference value falls from a difference sample D313 having a sample number 313 immediately preceding the flat area to the difference sample D314 and the difference value rises from the difference sample D316 to a difference sample D317 having a sample number 317 immediately subsequent to the flat area. Difference values before correction of the difference samples D313 to D317 are 9, 8, 8, 8, and 9, respectively.

The flat area correction unit 4 subtracts a correction value 0.5 from the difference sample D314 to correct a difference value to 7.5, and adds a correction value 0.5 to the difference sample D316 to correct a difference value to 8.5. In FIG. 6C, the difference samples D314 and D316 are difference samples to be corrected. The difference sample D314 is corrected to a corrected difference sample D314' having a difference value smaller than that of the difference sample D314. The difference sample D316 is corrected to a corrected difference sample D316' having a difference value between the difference sample D316 and the difference sample D317.

In this way, the flat area correction unit 4 alters the flat area having 3 samples of the difference signal having the falling-flat-rising pattern to not be flat.

Figure 6D:
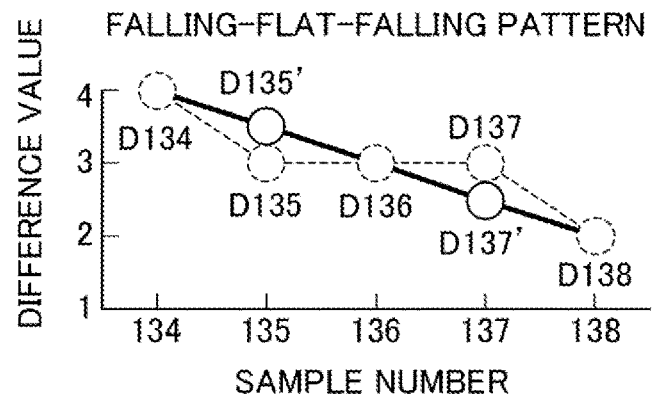
FIG. 6D is a diagram illustrating a falling-flat-falling pattern in which a flat area has three samples, and a first example of a method of correcting the flat area in this case.

In a difference signal shown in FIG. 6D, three difference samples D135 to D137 respectively having the numbers 135 to 137 form a flat area. FIG. 6D shows a falling-flat-falling pattern in which a difference value falls from a difference sample D134 having a sample number 134 immediately preceding the flat area to the difference sample D135, and the difference value falls from the difference sample D137 to a difference sample D138 having a sample number 138 immediately subsequent to the flat area. Difference values before correction of the difference samples D134 to D138 are 4, 3, 3, 3, and 2, respectively.

The flat area correction unit 4 adds a correction value 0.5 to the difference sample D135 to correct a difference value to 3.5, and subtracts a correction value 0.5 from the difference sample D137 to correct a difference value to 2.5. In FIG. 6D, the difference samples D135 and D137 are difference samples to be corrected. The difference sample D135 is corrected to a corrected difference sample D135' having a difference value between the difference sample D134 and the difference sample D135. The difference sample D137 is corrected to a corrected difference sample D137' having a difference value between the difference sample D136 and the difference sample D138.

In this way, the flat area correction unit 4 alters the flat area having 3 samples of the difference signal having the falling-flat-falling pattern to not be flat.

Figure 7A:
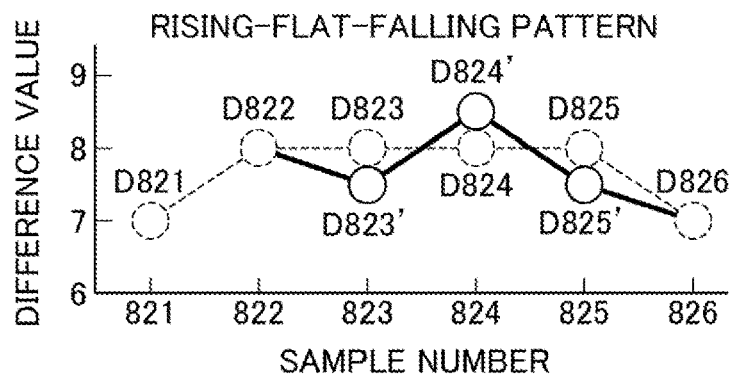
FIG. 7A is a diagram illustrating a rising-flat-falling pattern in which a flat area has four samples, and a first example of a method of correcting the flat area in this case.

In a difference signal shown in FIG. 7A, four difference samples D822 to D825 respectively having the numbers 822 to 825 form a flat area. FIG. 7A shows a rising-flat-falling pattern in which a difference value rises from a difference sample D821 having a sample number 821 immediately preceding the flat area to the difference sample D822, and the difference value falls from the difference sample D825 to a difference sample D826 having a sample number 826 immediately subsequent to the flat area. Difference values before correction of the difference samples D821 and D826 are both 7, and difference values before correction of the difference samples D822 to D825 are all 8.

The flat area correction unit 4 subtracts a correction value 0.5 from the difference sample D823 to correct a difference value to 7.5, and adds a correction value 0.5 to the difference sample D824 to correct a difference value to 8.5. Further, the flat area correction unit 4 subtracts a correction value 0.5 from the difference sample D825. In FIG. 7A, the difference samples D823 to D825 are difference samples to be corrected.

The difference sample D823 is corrected to a corrected difference sample D823' having a difference value between the difference sample D821 and the difference sample D823. The difference sample D824 is corrected to a corrected difference sample D824' having a difference value larger than that of the difference sample D824. The difference sample D825 is corrected to a corrected difference sample D825' having a difference value between the difference sample D825 and the difference sample D826.

In this way, the flat area correction unit 4 alters the flat area having 4 samples of the difference signal having the rising-flat-falling pattern to not be flat.

Figure 7B:
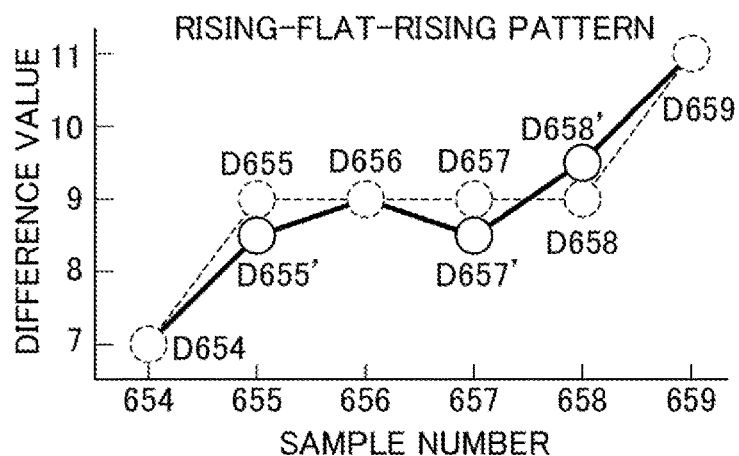
FIG. 7B is a diagram illustrating a rising-flat-rising pattern in which a flat area has four samples, and a first example of a method of correcting the flat area in this case.

In a difference signal shown in FIG. 7B, four difference samples D655 to D658 respectively having the numbers 655 to 658 form a flat area. FIG. 7B shows a rising-flat-rising pattern in which a difference value rises from a difference sample D654 having a sample number 654 immediately preceding the flat area to the difference sample D655, and the difference value rises from the difference sample D658 to a difference sample D659 having a sample number 659 immediately subsequent to the flat area. Difference values before correction of the difference samples D654 and D659 are 7 and 11, respectively, and difference values before correction of the difference samples D655 to D658 are 9.

The flat area correction unit 4 subtracts a correction value 0.5 from the difference sample D655 to correct a difference value to 8.5, and subtracts a correction value 0.5 from the difference sample D657 to correct a difference value to 8.5. Further, the flat area correction unit 4 adds a correction value 0.5 to the difference sample D658 to correct a difference value to 9.5. In FIG. 7B, the difference samples D655, D657, and D658 are difference samples to be corrected.

The difference sample D655 is corrected to a corrected difference sample D655' having a difference value between the difference sample D654 and the difference sample D655. The difference sample D657 is corrected to a corrected difference sample D657' having a difference value between the difference sample D654 and the difference sample D657. The difference sample D658 is corrected to a corrected difference sample D658' having a difference value between the difference sample D658 and the difference sample D659.

In this way, the flat area correction unit 4 alters the flat area having 4 samples of the difference signal having the rising-flat-rising pattern to not be flat.

Figure 7C:
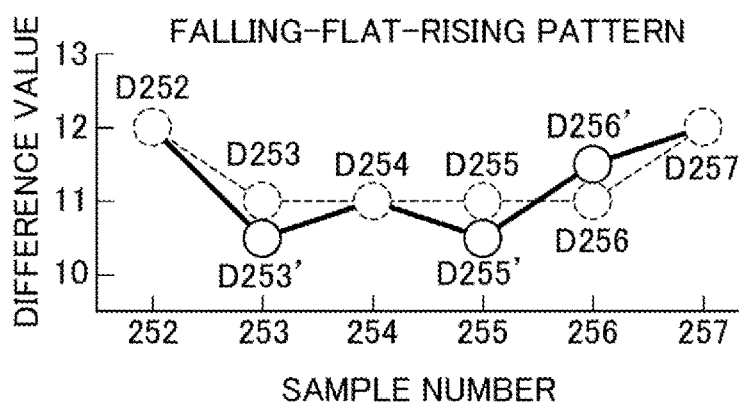
FIG. 7C is a diagram illustrating a falling-flat-rising pattern in which a flat area has four samples, and a first example of a method of correcting the flat area in this case.

In a difference signal shown in FIG. 7C, four difference samples D253 to D256 respectively having the numbers 253 to 256 form a flat area. FIG. 7C shows a falling-flat-rising pattern in which a difference value falls from a difference sample D252 having a sample number 252 immediately preceding the flat area to the difference sample D253 and the difference value rises from the difference sample D256 to a difference sample D257 having a sample number 257 immediately subsequent to the flat area. Difference values before correction of the difference samples D252 and D257 are both 12, and difference values before correction of the difference samples D253 to D256 are all 11.

The flat area correction unit 4 subtracts a correction value 0.5 from the difference sample D253 to correct a difference value to 10.5, and subtracts a correction value 0.5 from the difference sample D255 to correct a difference value to 10.5. Further, the flat area correction unit 4 adds a correction value 0.5 to the difference sample D256 to correct a difference value to 11.5. In FIG. 7C, the difference samples D253, D255, and D256 are difference samples to be corrected.

The difference sample D253 is corrected to a corrected difference sample D253' having a difference value smaller than that of the difference sample D253. The difference sample D255 is corrected to a corrected difference sample D255' having a difference value smaller than that of the difference sample D255. The difference sample D256 is corrected to a corrected difference sample D256' having a difference value between the difference sample D256 and the difference sample D257.

In this way, the flat area correction unit 4 alters the flat area having 4 samples of the difference signal having the falling-flat-rising pattern to not be flat.

Figure 7D:
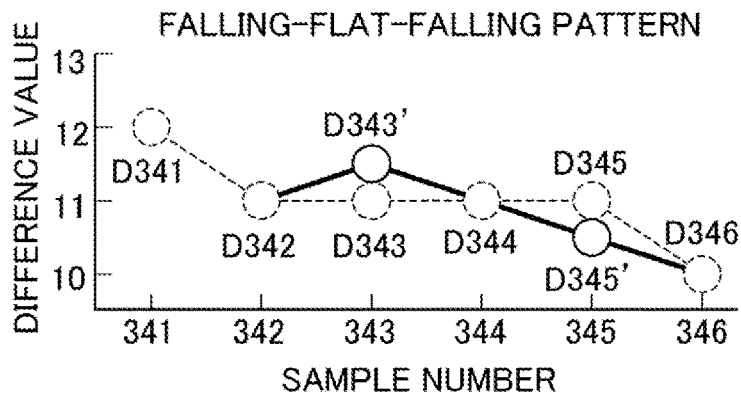
FIG. 7D is a diagram illustrating a falling-flat-falling pattern in which a flat area has four samples, and a first example of a method of correcting the flat area in this case.

In a difference signal shown in FIG. 7D, four difference samples D342 to D345 respectively having the numbers 342 to 345 form a flat area. FIG. 7D shows a falling-flat-falling pattern in which the difference value falls from a difference sample D341 having a sample number 341 immediately preceding the flat area to the difference sample D342, and the difference value falls from the difference sample D345 to a difference sample D346 having a sample number 346 immediately subsequent to the flat area. The difference values before correction of the difference samples D341 and D346 are 12 and 10, respectively, and the difference values before correction of the difference samples D342 to D345 are all 11.

The flat area correction unit 4 adds a correction value 0.5 to the difference sample D343 to correct the difference value to 11.5, and subtracts a correction value 0.5 from the difference sample D345 to correct the difference value to 10.5. In FIG. 7D, the difference samples D343 and D345 are difference samples to be corrected. The difference sample D343 is corrected to a corrected difference sample D343' having a difference value between the difference sample D341 and the difference sample D343. The difference sample D345 is corrected to a corrected difference sample D345' having a difference value between the difference sample D345 and the difference sample D346.

In this way, the flat area correction unit 4 alters the flat area having 4 samples of the difference signal having the falling-flat-falling pattern to not be flat.

Figure 8A:
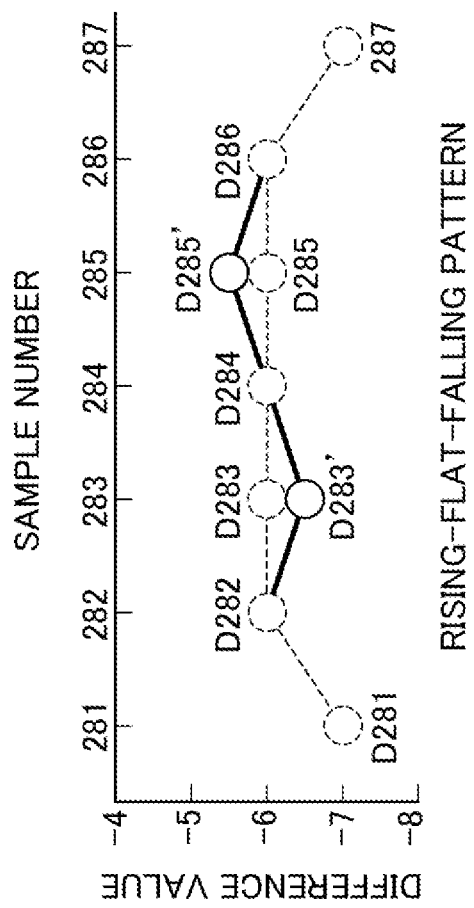
FIG. 8A is a diagram illustrating a rising-flat-falling pattern in which a flat area has five samples, and a first example of a method of correcting the flat area in this case.

In a difference signal shown in FIG. 8A, five difference samples D282 to D286 respectively having the numbers 282 to 286 form a flat area. FIG. 8A shows a rising-flat-falling pattern in which a difference value rises from a difference sample D281 having a sample number 281 immediately preceding the flat area to the difference sample D282 and the difference value falls from the difference sample D286 to a difference sample D287 having a sample number 287 immediately subsequent to the flat area. Difference values before correction of the difference samples D281 and D287 are both −7, and difference values before correction of the difference samples D282 to D286 are all −6.

The flat area correction unit 4 subtracts a correction value 0.5 from the difference sample D283 to correct a difference value to −6.5, and adds a correction value 0.5 to the difference sample D285 to correct a difference value to −5.5. In FIG. 8A, the difference samples D283 and D285 are difference samples to be corrected. The difference sample D283 is corrected to a corrected difference sample D283' having a difference value between the difference sample D281 and the difference sample D283. The difference sample D285 is corrected to a corrected difference sample D285' having a difference value larger than that of the difference sample D285.

In this way, the flat area correction unit 4 alters the flat area having 5 samples of the difference signal having the rising-flat-falling pattern to not be flat.

Figure 8B:
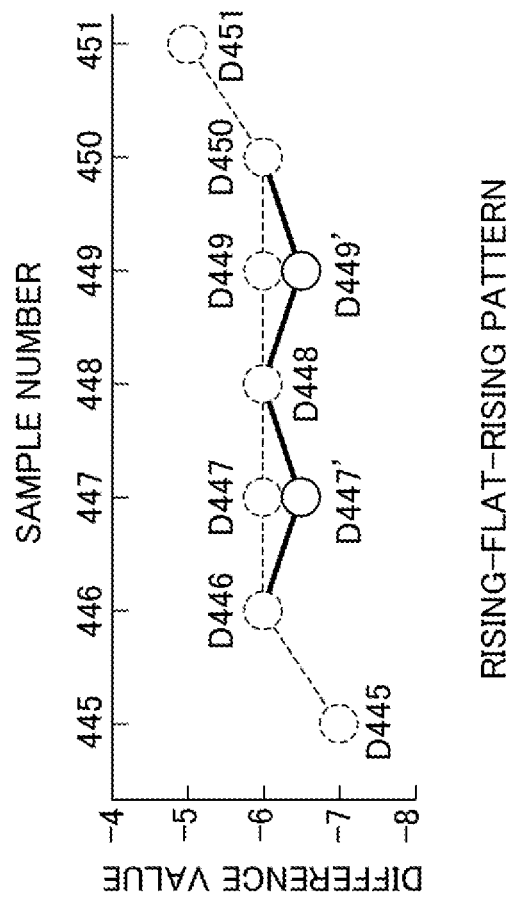
FIG. 8B is a diagram illustrating a rising-flat-rising pattern in which a flat area has five samples, and a first example of a method of correcting the flat area in this case.

In a difference signal shown in FIG. 8B, five difference samples D446 to D450 respectively having the numbers 446 to 450 form a flat area. FIG. 8B shows a rising-flat-rising pattern in which a difference value rises from a difference sample D445 having a sample number 445 immediately preceding the flat area to the difference sample D446, and the difference value rises from the difference sample D450 to a difference sample D451 having a sample number 451 immediately subsequent to the flat area. Difference values before correction of the difference samples D445 and D451 are −7 and −5, respectively, and difference values before correction of the difference samples D446 to D450 are −6.

The flat area correction unit 4 subtracts a correction value 0.5 from the difference sample D447 to correct a difference value to −6.5, and subtracts a correction value 0.5 from the difference sample D449 to correct a difference value to −6.5. In FIG. 8B, the difference samples D447 and D449 are difference samples to be corrected. The difference sample D447 is corrected to a corrected difference sample D447' having a difference value between the difference sample D445 and the difference sample D447. The difference sample D449 is corrected to a corrected difference sample D449' having a difference value between the difference sample D445 and the difference sample D449.

In this way, the flat area correction unit 4 alters the flat area having 5 samples of the difference signal having the rising-flat-rising pattern to not be flat.

Figure 8C:
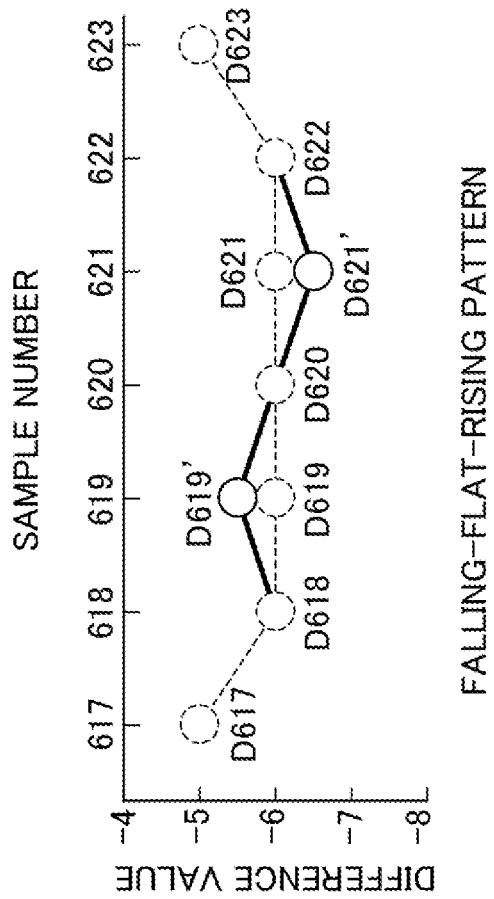
FIG. 8C is a diagram illustrating a falling-flat-rising pattern in which a flat area has five samples, and a first example of a method of correcting the flat area in this case.

In a difference signal shown in FIG. 8C, five difference samples D618 to D622 respectively having the numbers 618 to 622 form a flat area. FIG. 8C shows a falling-flat-rising pattern in which a difference value falls from a difference sample D617 having a sample number 617 immediately preceding the flat area to the difference sample D618 and the difference value rises from the difference sample D622 to a difference sample D623 having a sample number 623 immediately subsequent to the flat area. Difference values before correction of the difference samples D617 and D623 are both −5, and difference values before correction of the difference samples D618 to D622 are all −6.

The flat area correction unit 4 adds a correction value 0.5 to the difference sample D619 to correct a difference value to −5.5, and subtracts a correction value 0.5 from the difference sample D621 to correct a difference value to −6.5. In FIG. 8C, the difference samples D619 and D621 are difference samples to be corrected. The difference sample D619 is corrected to a corrected difference sample D619' having a difference value between the difference sample D617 and the difference sample D619. The difference sample D621 is corrected to a corrected difference sample D621' having a difference value smaller than that of the difference sample D621.

In this way, the flat area correction unit 4 alters the flat area having 5 samples of the difference signal having the falling-flat-rising pattern to not be flat.

Figure 8D:
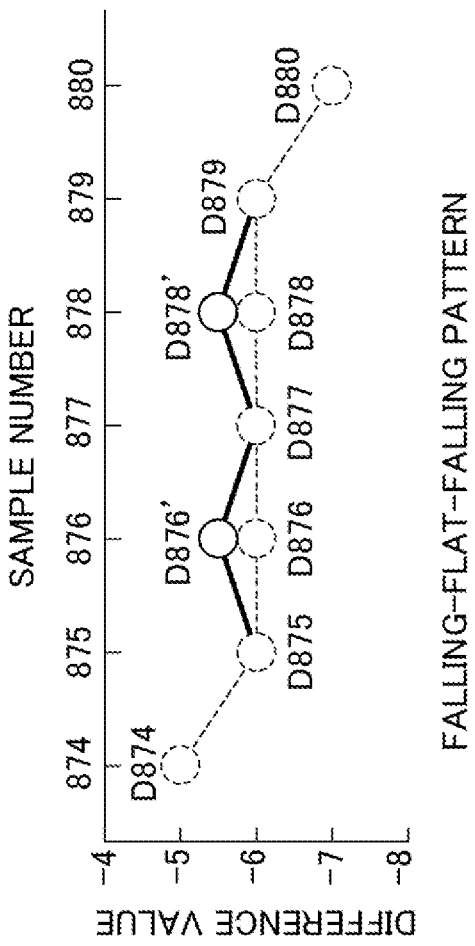
FIG. 8D is a diagram illustrating a falling-flat-falling pattern in which a flat area has five samples, and a first example of a method of correcting the flat area in this case.

In a difference signal shown in FIG. 8D, five difference samples D875 to D879 respectively having the numbers 875 to 879 form a flat area. FIG. 8D shows a falling-flat-falling pattern in which a difference value falls from a difference sample D874 having a sample number 874 immediately preceding the flat area to the difference sample D875, and the difference value falls from the difference sample D879 to a difference sample D880 having a sample number 880 immediately subsequent to the flat area. Difference values before correction of the difference samples D874 and D880 are −5 and −7, respectively, and difference values before correction of the difference samples D875 to D879 are −6.

The flat area correction unit 4 adds a correction value 0.5 to the difference sample D876 to correct a difference value to −5.5, and adds a correction value 0.5 to the difference sample D878 to correct a difference value to −5.5. In FIG. 8D, the difference samples D876 and D878 are difference samples to be corrected. The difference sample D876 is corrected to a corrected difference sample D876' having a difference value between the difference sample D874 and the difference sample D876. The difference sample D878 is corrected to a corrected difference sample D878' having a difference value between the difference sample D874 and the difference sample D878.

In this way, the flat area correction unit 4 alters the flat area having 5 samples of the difference signal having the falling-flat-falling pattern to not be flat.

Incidentally, the flat areas generated in the difference signal calculated based on the digital music signal have at most 5 samples, and flat areas having 6 or more samples hardly occur. Therefore, the flat area correction unit 4 may set the positions in a flat area at which difference samples are to be corrected and the correction values to be added or subtracted, corresponding to each pattern in which the number of samples is two shown in FIGS. 5A to 5D, the number of samples is three shown in FIGS. 6A to 6D, the number of samples is four shown in FIGS. 7A to 7D, and the number of samples is five shown in FIGS. 8A to 8D.

The number of samples up to which the flat area correction unit 4 sets positions in a flat area where difference samples are to be corrected and sets correction values is discretionary.

The method of correcting a flat area performed by the flat area correction unit 4 is not limited to a first example shown in FIGS. 5A to 5D, 6A to 6D, 7A to 7D, and 8A to 8D. The flat area correction unit 4 may correct a flat area such that a difference sample at a start position of the flat area falls and the difference value of a difference sample at an end position rises, based on the center point of the flat area. Further, the flat area correction unit 4 may correct a flat area such that the difference sample at the start position of the flat area rises and the difference value of the difference sample at the end position falls, based on the center point of the flat area. FIGS. 9, 10A, 10B, 11A to 11D, and 12A to 12D show a second example of a method of correcting a flat area, which is an example of correcting an entire flat area so as to rise or fall.

In the correction of each of the rising-flat-falling pattern, rising-flat-rising pattern, and falling-flat-rising pattern having a flat area of two samples shown in FIGS. 5A to 5C, the flat area is corrected such that one rises and the other falls, or one falls and the other rises, based on the center point of the flat area. Therefore, the correction method according to the first example shown in FIGS. 5A to 5C can be used as the correction method according to the second example without any changes.

Figure 9:
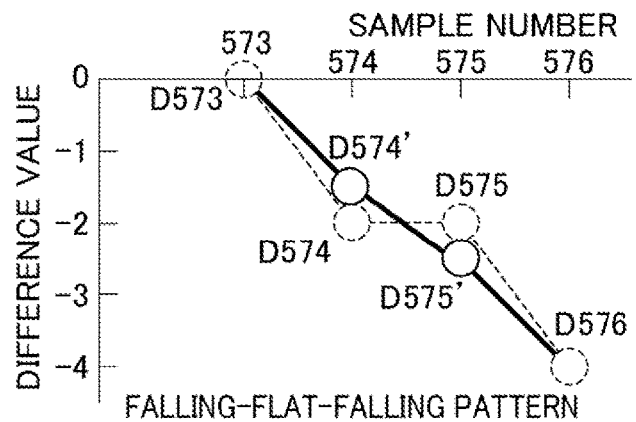
FIG. 9 is a diagram illustrating a falling-flat-falling pattern in which a flat area has two samples, and a second example of a method of correcting the flat area in this case.

In the second example, the flat area correction unit 4 uses a correction method shown in FIG. 9 instead of the correction method shown in FIG. 5D as the method of correcting a flat area having 2 samples in the falling-flat-falling pattern.

The flat area correction unit 4 adds a correction value 0.5 to a difference sample D574 to correct the difference value to −1.5, and subtracts a correction value 0.5 from a difference sample D575 to correct the difference value to −2.5. In FIG. 9, the difference samples D574 and D575 are difference samples to be corrected. The difference sample D574 is corrected to a corrected difference sample D574' having a difference value between a difference sample D573 and the difference sample D574. The difference sample D575 is corrected to a corrected difference sample D575' having a difference value between the difference sample D575 and a difference sample D576.

Figure 10A:
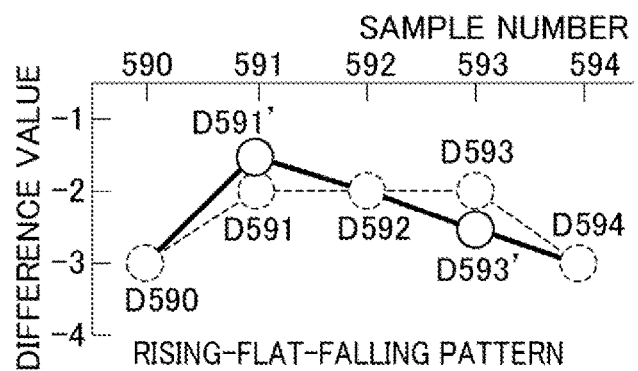
FIG. 10A is a diagram illustrating a rising-flat-falling pattern in which a flat area has three samples, and a second example of a method of correcting the flat area in this case.
Figure 10B:
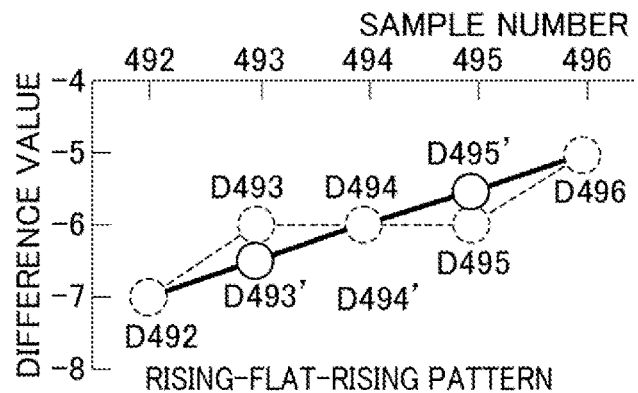
FIG. 10B is a diagram illustrating a rising-flat-rising pattern in which a flat area has three samples, and a second example of a method of correcting the flat area in this case.

In the second example, the flat area correction unit 4 uses correction methods shown in FIGS. 10A and 10B instead of the correction methods shown in FIGS. 6A and 6B as the method of correcting each of the rising-flat-falling pattern and rising-flat-rising pattern having a flat area of 3 samples. In the correction of each of the falling-flat-rising pattern and falling-flat-falling pattern having a flat area of 3 samples shown in FIGS. 6C and 6D, the flat area is corrected such that one rises and the other falls or one falls and the other rises, based on the center point of the flat area. Therefore, the correction method according to the first example shown in FIGS. 6C and 6D can be used as the correction method according to the second example without any changes.

As shown in FIG. 10A, in a rising-flat-falling pattern, the flat area correction unit 4 adds a correction value 0.5 to a difference sample D591 to correct the difference value to −1.5, and subtracts a correction value 0.5 from a difference sample D593 to correct the difference value to −2.5. In FIG. 10A, the difference samples D591 and D593 are difference samples to be corrected. The difference sample D591 is corrected to a corrected difference sample D591' having a difference value larger than that of the difference sample D591. The difference sample D593 is corrected to a corrected difference sample D593' having a difference value between the difference sample D593 and a difference sample D594.

As shown in FIG. 10B, in a rising-flat-rising pattern, the flat area correction unit 4 subtracts a correction value 0.5 from a difference sample D493 to correct the difference value to −6.5, and adds a correction value 0.5 to a difference sample D495 to correct the difference value to −5.5. In FIG. 10B, the difference samples D493 and D495 are difference samples to be corrected. The difference sample D493 is corrected to a corrected difference sample D493' having a difference value between a difference sample D492 and the difference sample D493. The difference sample D495 is corrected to a corrected difference sample D495' having a difference value between the difference sample D495 and a difference sample D496.

In the second example, the flat area correction unit 4 uses correction methods shown in FIGS. 11A to 11D instead of the correction methods shown in FIGS. 7A to 7D as the method of correcting all patterns having a flat areas of 4 samples.

Figure 11A:
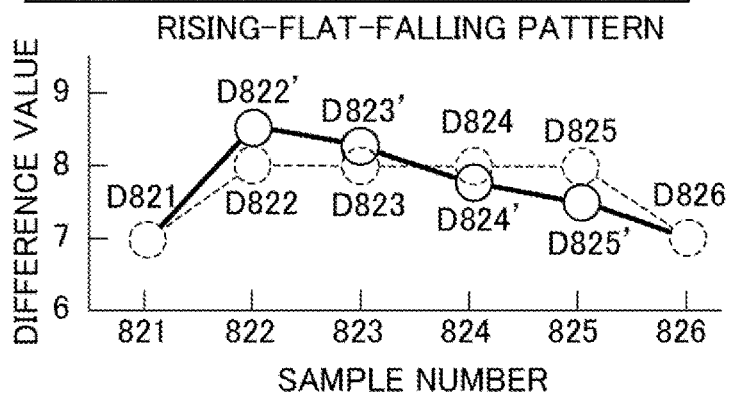
FIG. 11A is a diagram illustrating a rising-flat-falling pattern in which a flat area has four samples, and a second example of a method of correcting the flat area in this case.

As shown in FIG. 11A, in a rising-flat-falling pattern, the flat area correction unit 4 adds a correction value 0.5 to a difference sample D822 to correct the difference value to 8.5, and adds a correction value 0.25 to a difference sample D823 to correct the difference value to 8.25. Further, the flat area correction unit 4 subtracts a correction value 0.25 from a difference sample D824 to correct the difference value to 7.75, and subtracts a correction value 0.5 from a difference sample D825 to correct the difference value to 7.5. In FIG. 11A, the difference samples D822 to D825 are difference samples to be corrected.

The difference sample D822 is corrected to a corrected difference sample D822' having a difference value larger than that of the difference sample D822. The difference sample D823 corrected to a corrected difference sample D823' having a difference value between the corrected difference sample D822' and the difference sample D823. The difference sample D825 is corrected to a corrected difference sample D825' having a difference value between the difference sample D825 and a difference sample D826. The difference sample D824 is corrected to a corrected difference sample D824' having a difference value between the difference sample D824 and the corrected difference sample D825'.

In this way, the correction value added to the difference sample and the correction value subtracted from the difference sample are not limited to 0.5, and 0.25 can also be used for the values.

Figure 11B:
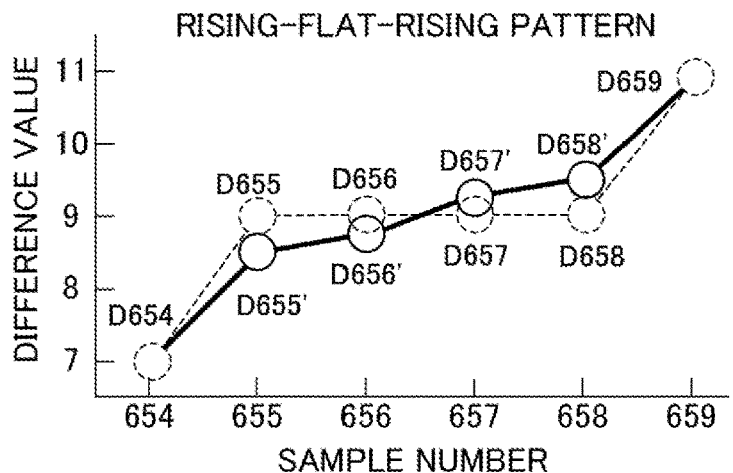
FIG. 11B is a diagram illustrating a rising-flat-rising pattern in which a flat area has four samples, and a second example of a method of correcting the flat area in this case.

As shown in FIG. 11B, in a rising-flat-rising pattern, the flat area correction unit 4 subtracts a correction value 0.5 from a difference sample D655 to correct the difference value to 8.5, and subtracts a correction value 0.25 from a difference sample D656 to correct the difference value to 8.75. Further, the flat area correction unit 4 adds a correction value 0.25 to a difference sample D657 to correct the difference value to 9.25, and adds a correction value 0.5 to a difference sample D658 to correct the difference value to 9.5. In FIG. 11B, the difference samples D655 to D658 are difference samples to be corrected.

The difference sample D655 is corrected to a corrected difference sample D655' having a difference value between a difference sample D654 and the difference sample D655.

The difference sample D656 is corrected to a corrected difference sample D656' having a difference value between the corrected difference sample D655' and the difference sample D656. The difference sample D658 is corrected to a corrected difference sample D658' having a difference value between the difference sample D658 and a difference sample D659. The difference sample D657 is corrected to a corrected difference sample D657' having a difference value between the difference sample D657 and the corrected difference sample D658'.

Figure 11C:
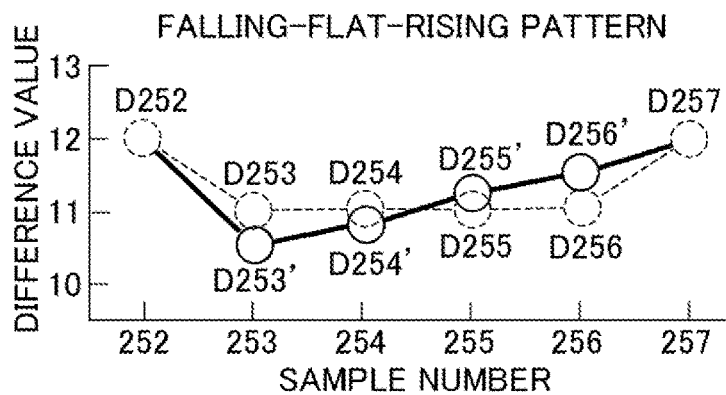
FIG. 11C is a diagram illustrating a falling-flat-rising pattern in which a flat area has four samples, and a second example of a method of correcting the flat area in this case.

As shown in FIG. 11C, in a falling-flat-rising pattern, the flat area correction unit 4 subtracts a correction value 0.5 from a difference sample D253 to correct the difference value to 10.5, and subtracts a correction value 0.25 from a difference sample D254 to correct the difference value to 10.75. Further, the flat area correction unit 4 adds a correction value 0.25 to a difference sample D255 to correct a difference value to 11.25, and adds a correction value 0.5 to a difference sample D256 to correct a difference value to 11.5. In FIG. 11C, the difference samples D253 to D256 are difference samples to be corrected.

The difference sample D253 is corrected to a corrected difference sample D253' having a difference value smaller than that of the difference sample D253. The difference sample D254 is corrected to a corrected difference sample D254' having a difference value between the corrected difference sample D253' and the difference sample D254. The difference sample D256 is corrected to a corrected difference sample D256' having a difference value between the difference sample D256 and a difference sample D257. The difference sample D255 is corrected to a corrected difference sample D255' having a difference value between the difference sample D255 and the corrected difference sample D256'.

Figure 11D:
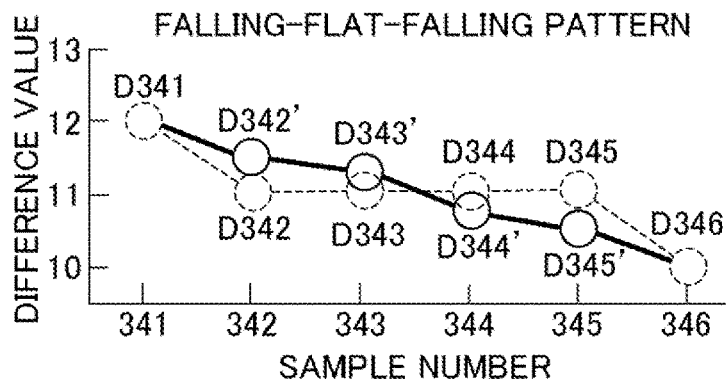
FIG. 11D is a diagram illustrating a falling-flat-falling pattern in which a flat area has four samples, and a second example of a method of correcting the flat area in this case.

As shown in FIG. 11D, in a falling-flat-falling pattern, the flat area correction unit 4 adds a correction value 0.5 to a difference sample D342 to correct the difference value to 11.5, and adds a correction value 0.25 to a difference sample D343 to correct the difference value to 11.25. Further, the flat area correction unit 4 subtracts a correction value 0.25 from a difference sample D344 to correct the difference value to 10.75, and subtracts a correction value 0.5 from a difference sample D345 to correct the difference value to 10.5. In FIG. 11D, the difference samples D342 to D345 are difference samples to be corrected.

The difference sample D342 is corrected to a corrected difference sample D342' having a difference value between a difference sample D341 and the difference sample D342. The difference sample D343 is corrected to a corrected difference sample D343' having a difference value between the corrected difference sample D342' and the difference sample D343. The difference sample D345 is corrected to a corrected difference sample D345' having a difference value between the difference sample D345 and a difference sample D346. The difference sample D344 is corrected to a corrected difference sample D344' having a difference value between the difference sample D344 and the corrected difference sample D345'.

In the second example, the flat area correction unit 4 uses correction methods shown in FIGS. 12A to 12D instead of the correction methods shown in FIGS. 8A to 8D as the methods of correcting all patterns having flat areas of 5 samples.

Figure 12A:
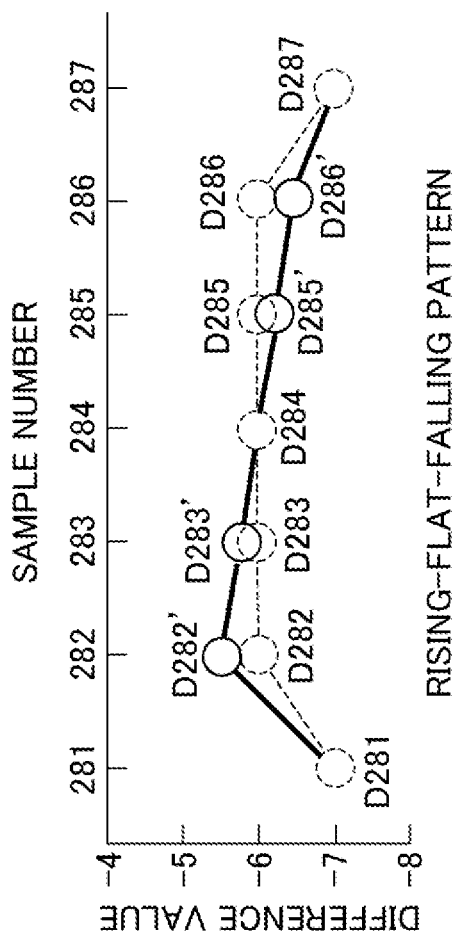
FIG. 12A is a diagram illustrating a rising-flat-falling pattern in which a flat area has five samples, and a second example of a method of correcting the flat area in this case.

As shown in FIG. 12A, in a rising-flat-falling pattern, the flat area correction unit 4 adds a correction value 0.5 to a difference sample D282 to correct the difference value to −5.5, and adds a correction value 0.25 to a difference sample D283 to correct the difference value to −5.75. Further, the flat area correction unit 4 subtracts a correction value 0.25 from a difference sample D285 to correct the difference value to −6.25, and subtracts a correction value 0.5 from a difference sample D286 to correct the difference value to −6.5. In FIG. 12A, the difference samples D282, D283, D285, and D286 are difference samples to be corrected.

The difference sample D282 is corrected to a corrected difference sample D282' having a difference value larger than that of the difference sample D282. The difference sample D283 is corrected to a corrected difference sample D283' having a difference value between the corrected difference sample D282' and the difference sample D283. The difference sample D286 is corrected to a corrected difference sample D286' having a difference value between the difference sample D286 and a difference sample D287. The difference sample D285 is corrected to a corrected difference sample D285' having a difference value between the difference sample D285 and the corrected difference sample D286'.

Figure 12B:
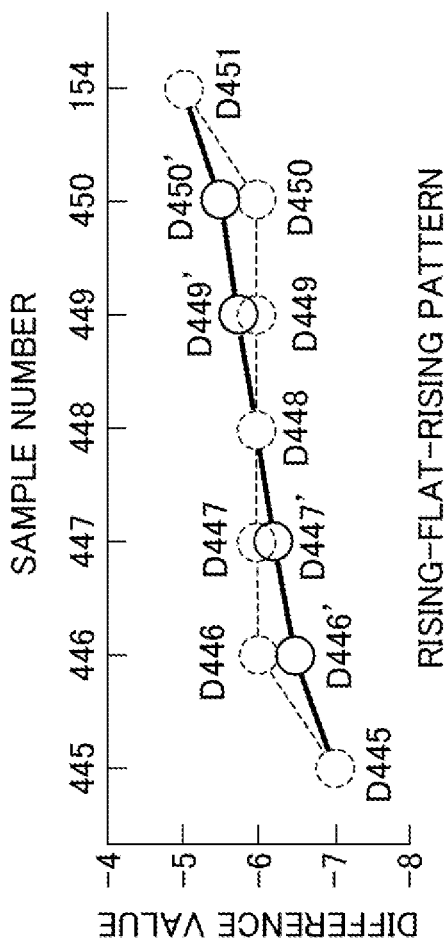
FIG. 12B is a diagram illustrating a rising-flat-rising pattern in which a flat area has five samples, and a second example of a method of correcting the flat area in this case.

As shown in FIG. 12B, in a rising-flat-rising pattern, the flat area correction unit 4 subtracts a correction value 0.5 from a difference sample D446 to correct the difference value to −6.5, and subtracts a correction value 0.25 from a difference sample D447 to correct the difference value to −6.25. Further, the flat area correction unit 4 adds a correction value 0.25 to a difference sample D449 to correct the difference value to −5.75, and adds a correction value 0.5 to a difference sample D450 to correct the difference value to −5.5. In FIG. 12B, the difference samples D446, D447, D449, and D450 are difference samples to be corrected.

The difference sample D446 is corrected to a corrected difference sample D446' having a difference value between a difference sample D445 and the difference sample D446. The difference sample D447 is corrected to a corrected difference sample D447' having a difference value between the corrected difference sample D446' and the difference sample D447. The difference sample D450 is corrected to a corrected difference sample D450' having a difference value between the difference sample D450 and a difference sample D451. The difference sample D449 is corrected to a corrected difference sample D449' having a difference value between the difference sample D449 and the corrected difference sample D450'.

Figure 12C:
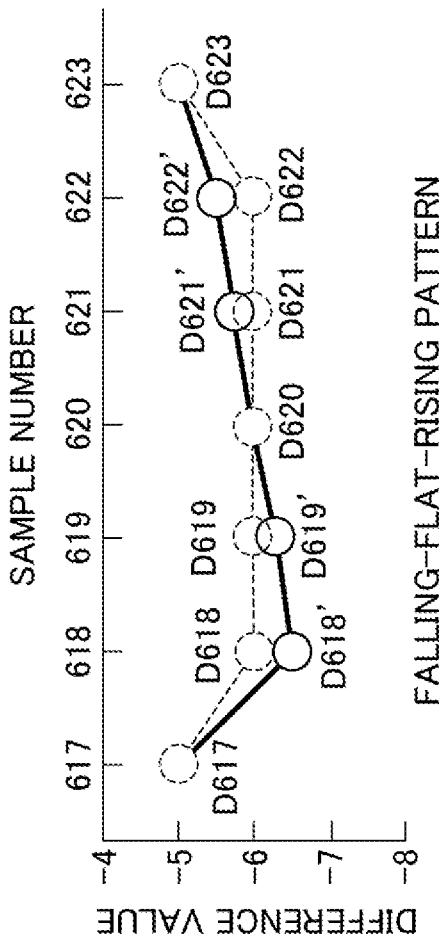
FIG. 12C is a diagram illustrating a falling-flat-rising pattern in which a flat area has five samples, and a second example of a method of correcting the flat area in this case.

As shown in FIG. 12C, in a falling-flat-rising pattern, the flat area correction unit 4 subtracts a correction value 0.5 from a difference sample D618 to correct the difference value to −6.5, and subtracts a correction value 0.25 from a difference sample D619 to correct the difference value to −6.25. Further, the flat area correction unit 4 adds a correction value 0.25 to a difference sample D621 to correct the difference value to −5.75, and adds a correction value 0.5 to a difference sample D622 to correct the difference value to −5.5. In FIG. 12C, the difference samples D618, D619, D621, and D622 are difference samples to be corrected.

The difference sample D618 is corrected to a corrected difference sample D618' having a difference value smaller than that of the difference sample D618. The difference sample D619 is corrected to a corrected difference sample D619' having a difference value between the corrected difference sample D618' and the difference sample D619. The difference sample D622 is corrected to a corrected difference sample D622' having a difference value between the difference sample D622 and a difference sample D623. The difference sample D621 is corrected to a corrected difference sample D621' having a difference value between the difference sample D621 and the corrected difference sample D622'.

Figure 12D:
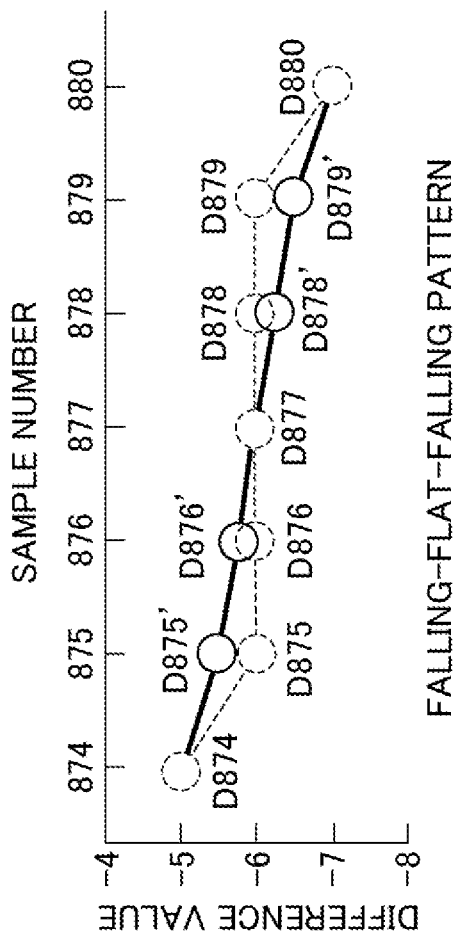
FIG. 12D is a diagram illustrating a falling-flat-falling pattern in which a flat area has five samples, and a second example of a method of correcting the flat area in this case.

As shown in FIG. 12D, in a falling-flat-falling pattern, the flat area correction unit 4 adds a correction value 0.5 to a difference sample D875 to correct the difference value to −5.5, and adds a correction value 0.25 to a difference sample D876 to correct the difference value to −5.75. Further, the flat area correction unit 4 subtracts a correction value 0.25 from a difference sample D878 to correct the difference value to −6.25, and subtracts a correction value 0.5 from a difference sample D879 to correct the difference value to −6.5. In FIG. 12D, the difference samples D875, D876, D878, and D879 are difference samples to be corrected.

The difference sample D875 is corrected to a corrected difference sample D875' having a difference value between a difference sample D874 and the difference sample D875. The difference sample D876 is corrected to a corrected difference sample D876' having a difference value between the corrected difference sample D875' and the difference sample D876. The difference sample D879 is corrected to a corrected difference sample D879' having a difference value between the difference sample D879 and a difference sample D880. The difference sample D878 is corrected to a corrected difference sample D878' having a difference value between the difference sample D878 and the corrected difference sample D879'.

In the first and second examples described above, the flat area correction unit 4 needs to alter a flat area to not be flat such that adjacent difference samples in the flat area do not have the same difference values after correction. The flat area correction unit 4 altering a flat area to not be flat means that the difference samples in a flat area are corrected without leaving a flat area having two or more samples.

In the second example, if the flat area in the difference signal has three or five samples, that is, if the flat area has a central difference sample, the flat area correction unit 4 may set the correction value of the central difference sample to 0.

In the second example, if a difference signal having the rising-flat-falling pattern and a difference signal having the falling-flat-rising pattern form waveforms that are symmetrical to each other in the time axis direction, the flat area correction unit 4 may also target the correction methods of the flat areas. Further, if a difference signal having the rising-flat-rising pattern and a difference signal having the falling-flat-falling pattern form waveforms that are symmetrical to each other in the time axis direction, the flat area correction unit 4 may also target the correction methods of the flat areas.

Returning to FIG. 1, a difference signal (second difference signal) having a flat area that is altered to not be flat by the flat area correction unit 4 is supplied to the difference signal averaging unit 5. The difference signal averaging unit 5, for each frame, calculates a difference average value by summing values of difference samples included in one frame and dividing the values by the number of difference samples included in one frame.

The difference average value being zero means that the amount of change on the positive side and the amount of change on the negative side of the difference signal in each frame are equal. The difference signal averaging unit 5 supplies, to the requantization error generation unit 6, the difference signal supplied from the flat area correction unit 4 as a third difference signal without any changes.

When the difference average value is not zero and is a predetermined value, the difference signal averaging unit 5 subtracts the difference average value from the difference value of each difference sample of the difference signal. Then, the difference average value of the difference signal becomes zero, and the amount of change on the positive side and the amount of change on the negative side of the difference signal in each frame can be made equal. The difference signal averaging unit 5 supplies, to the requantization error generation unit 6, the difference signal (third difference signal) corrected such that the amount of change on the positive side and the amount of change on the negative side of the difference signal are equal to each other.

In FIG. 1, the first digital music signal in which the number of quantization bits is 16 and the second digital music signal in which the number of quantization bits is 24 are set as targets. Therefore, the requantization error generation unit 6 multiplies the received difference signal by a coefficient and generates a requantization error signal to be added to (n−m) bits which are 8 bits. Assuming that the requantization error signal to be added to 8 bits is Qerror[i] and the difference value of the input difference signal is diff[i], the requantization error signal Qerror[i] is expressed by formula (5).

$$Q\text{error}[i]=(512/131070)\cdot\text{diff}[i] \tag{5}$$

Since the requantization error signal needs to be expressed by 8 bits+a sign bit (1 bit), there are 512 steps that are the total of 0 to 255 steps on the positive side and −1 to −256 steps on the negative side. Therefore, the difference value is divided into 512 steps.

When the first digital music signal in which the number of quantization bits is 16 changes from negative to positive, the maximum difference amount is 65535 by subtracting −32768, which is the maximum value of negative 16 bits, from 32767, which is the maximum value of positive 16 bits. When the first digital music signal in which the number of quantization bits is 16 changes from positive to negative, the maximum difference amount is −65535 by subtracting 32767, which is the maximum value of positive 16 bits, from −32768, which is the maximum value of negative 16 bits.

Therefore, since there is a possibility of there being a maximum value on the positive side and a maximum value on the negative side, the change range of the difference amounts is 131070 from 165535−(−65535)|.

A coefficient multiplied by the difference value diff[i] in formula (5) is the inverse of the division width obtained by dividing the change range of the difference amounts by the division number. Further, the coefficient multiplied by the difference value diff[i] is determined according to the number of quantization bits of the first digital music signal and the extent to which the bits of the first digital music signal are extended, that is, the value of (n−m).

The requantization error generation unit 6 supplies the requantization error signal generated as described above to the addition unit 7. The delay element 8 delays a framed digital music signal output from the framing processing unit 1 by one sample and supplies the signal to the addition unit 7. This is because, as described above, the difference value is not calculated in the first sample of each frame.

As shown in formula (3), the addition unit 7 multiplies the input digital music signal by a value of 256 to generate a space of 8 bits, and then adds the requantization error signal. The addition unit 7 rounds off the numerical value after the decimal point and outputs a digital music signal of which the bits are extended to 24 bits.

Figure 13:
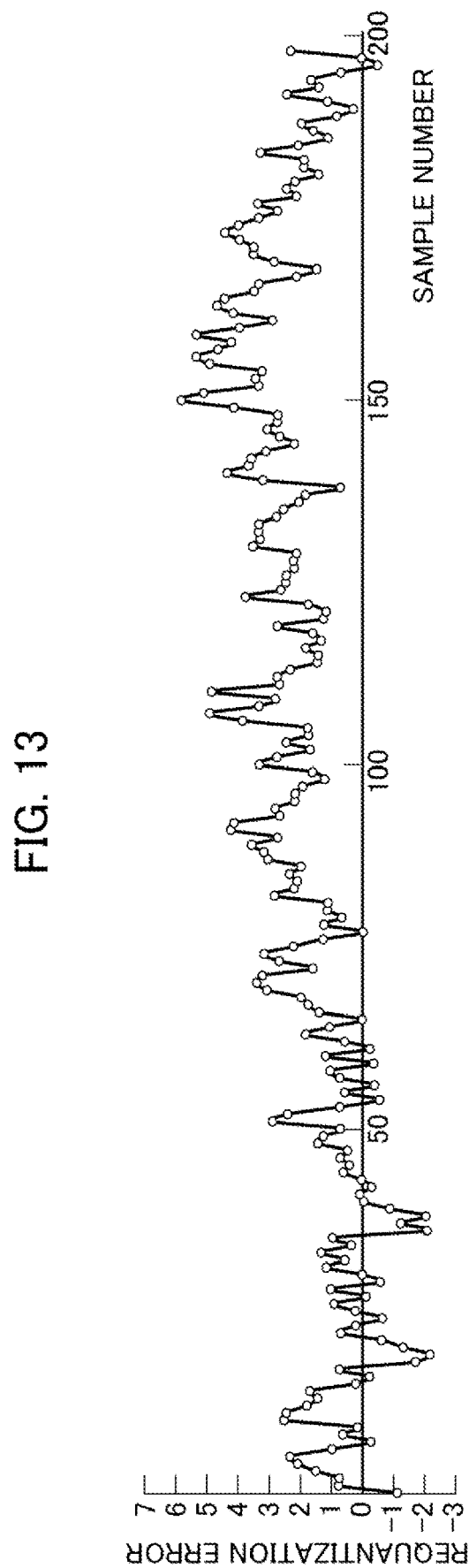
FIG. 13 is a waveform diagram illustrating a requantization error signal of a digital music signal recorded by quantizing a performance of a predetermined musical piece with a format in which the number of quantization bits is 24.

FIG. 13 shows a requantization error signal obtained from two digital music signals. The two digital music signals are obtained by quantizing a performance of a predetermined musical piece different from that of FIG. 3 with two formats in which the number of quantization bits is 16 and the number of quantization bits is 24 and by recording the performance at a sampling frequency of 192 kHz at the same time using the same equipment.

In FIG. 13, similarly to FIG. 3, to compare the first digital music signal in which the number of quantization bits is 16 with the second digital music signal in which the number of quantization bits is 24, the second digital music signal is multiplied by 1/256, and the lower 8 bits of the second digital music signal are expressed using decimal points. Leading positions of the first digital music signal and the second digital music signal of which the lower 8 bits are expressed using decimal points are aligned, and a difference value between sample values of both signals is calculated as a requantization error for each sample.

Figure 14:
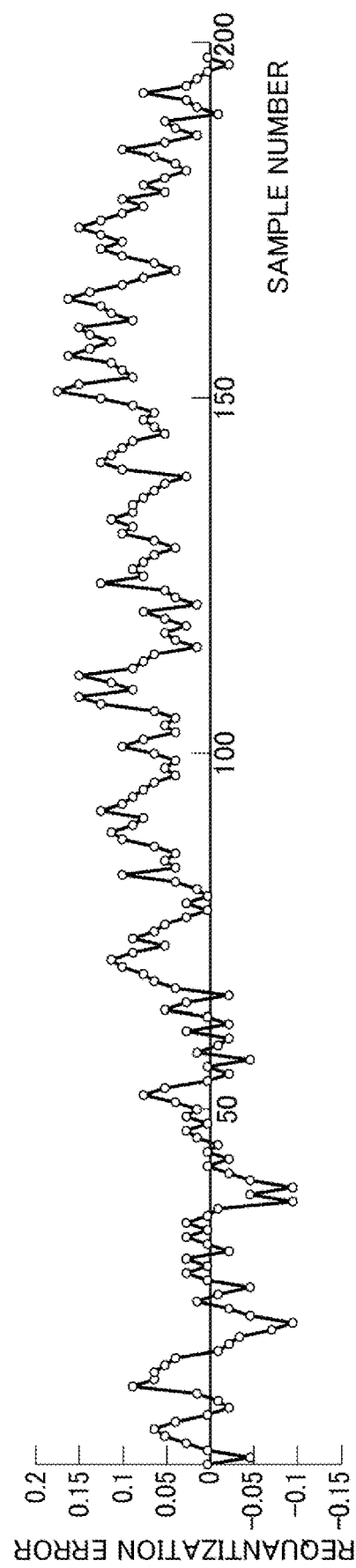
FIG. 14 is a waveform diagram illustrating a requantization error signal of a digital music signal which is obtained by performing processing to extend the number of quantization bits of a digital music signal, which is from the same musical piece as that in FIG. 13, to 24 by using the bit extension processing apparatus according to one or more embodiments.

FIG. 14 shows a quantization error signal of a second digital music signal. The second digital music signal is obtained by performing processing to extend the number of quantization bits of a first digital music signal, which is from the same musical piece as that in FIG. 13, to 24 by using the bit extension processing apparatus 100 shown in FIG. 1. The second digital music signal is multiplied by 1/256, and the lower 8 bits of the second digital music signal are expressed using decimal points. Leading positions of the first digital music signal and the second digital music signal of which the lower 8 bits are expressed using decimal points are aligned, and a difference value between sample values of both signals is calculated as a requantization error for each sample.

A comparison between the requantization error signal shown in FIG. 13 and the requantization error signal shown in FIG. 14 reveals that both signals are very similar. According to the bit extension processing apparatus 100 and the bit extension processing method performed by the bit extension processing apparatus 100, it is possible to perform processing to extend the number of bits of the digital music signal with high quality. This effect can be obtained regardless of the type of musical piece. Even if the method of correcting the difference sample for altering flat areas to not be flat is different, if a flat area which does not exist originally is altered to not be flat, it is possible to increase the correlation between the requantization error signal and the difference value. Therefore, the method of correcting the difference sample is not limited.

The bit extension processing apparatus 100 shown in FIG. 1 may be constituted of hardware using a circuit or software. The bit extension processing apparatus 100 shown in FIG. 1 can be realized by a central processing unit (CPU) of a microcomputer executing a bit extension processing program.

Figure 15:
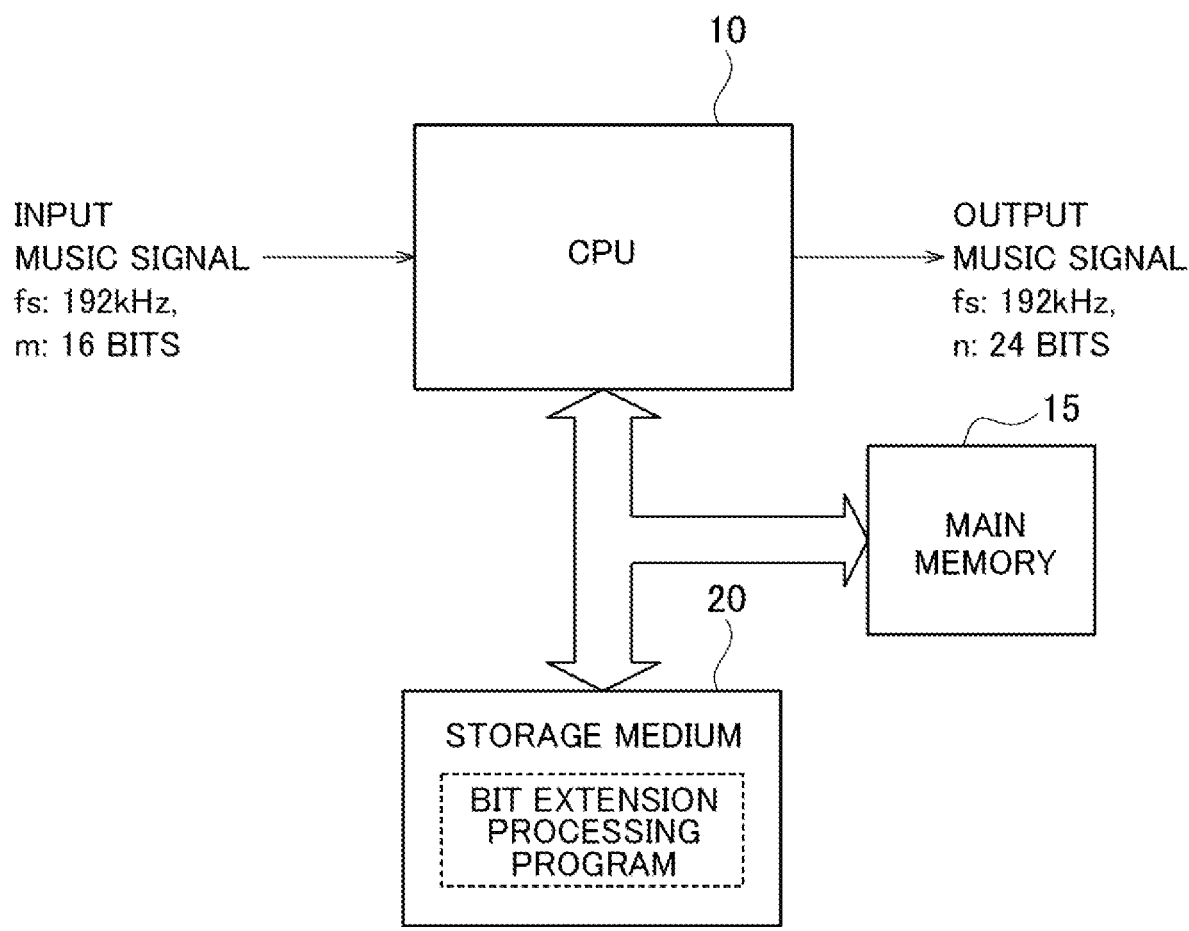
FIG. 15 is a block diagram illustrating an example of the configuration of a computer executing a bit extension processing program according to one or more embodiments.

In FIG. 15, a CPU 10, a main memory 15, and a storage medium 20 are connected via a bus. The storage medium 20 is any non-transitory storage medium such as a hard disk drive, an optical disk, or a semiconductor memory. The storage medium 20 stores the bit extension processing program. The bit extension processing program may be transmitted from an external server via a communication line such as the Internet and stored in the storage medium 20.

The CPU 10 loads the bit extension processing program stored in the storage medium 20 into the main memory 15. By the CPU 10 executing each command described in the bit extension processing program loaded into the main memory 15, the CPU causes the processing shown in FIG. 16 to be performed.

Figure 16:
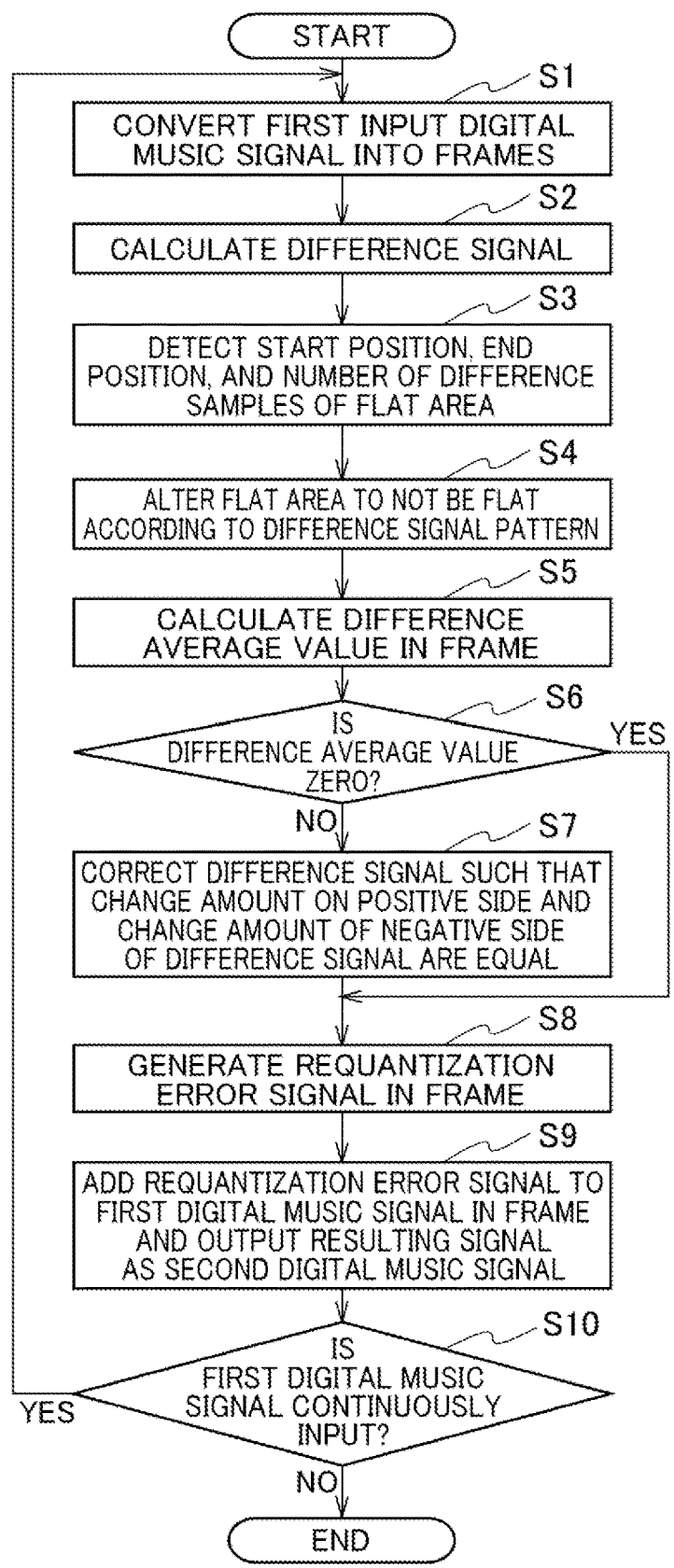
FIG. 16 is a flowchart illustrating an operation performed by the bit extension processing apparatus according to one or more embodiments, processing performed by means of a bit extension processing method according to one or more embodiments, and processing that the bit extension processing program according to one or more embodiments causes a computer to perform.

With reference to the flowchart shown in FIG. 16, processing that the bit extension processing program causes the CPU 10 to perform will be described. FIG. 16 shows an operation performed by the bit extension processing apparatus 100 shown in FIG. 1 and processing performed by means of the bit extension processing method performed by the bit extension processing apparatus 100.

In step S1 of FIG. 16, the CPU 10 converts an input first digital music signal into frames. The CPU 10 calculates a difference signal in a frame in step S2. In step S3, the CPU 10 detects a start position, an end position, and the number of difference samples of a flat area in the difference signal. The CPU 10 alters the flat area to not be flat according to the pattern of the difference signal in step S4. The CPU 10 calculates a difference average value in the frame in step S5.

The CPU 10 determines whether the difference average value is 0 in step S6. If the difference average value is 0 (YES), the CPU 10 moves the processing to step S8. If the difference average value is not 0 (NO), the CPU 10 corrects the difference signal such that the amount of change on the positive side and the amount of change on the negative side of the difference signal are equal in step S7, and moves the processing to step S8.

The CPU 10 generates a quantization error in a frame in step S8. In step S9, the CPU 10 adds the quantization error to a first digital music signal in the frame and outputs the resulting signal as a second digital music signal.

The CPU 10 determines whether the first digital music signal is continuously input in step S10. If the first digital music signal is continuously input (YES), the CPU 10 repeats the processing of steps S1 to S10. Alternatively, if the first digital music signal is not continuously input (NO), the CPU 10 ends the processing.

The present invention is not limited to one or more embodiments described above and various modifications are possible without deviating from the scope of the present invention.

What is claimed is:

1. A bit extension processing apparatus comprising:
a framing processing unit configured to convert samples of a first digital music signal quantized with a first number of quantization bits, into frames by dividing the samples at each number of a plurality of samples;
a difference signal calculation unit configured to calculate a first difference signal in which a difference sample is a difference value between two adjacent samples of the first digital music signal in each frame;
a flat area detection unit configured to detect a start position, an end position, and the number of difference samples of a flat area where two or more difference samples having the same sample value in the first difference signal are continuous;
a flat area correction unit configured to set one or more difference samples out of the difference samples of the flat area as a difference sample to be corrected, to correct a value of the sample to be corrected by adding or subtracting a correction value to or from the value of the sample to be corrected, and to generate a second difference signal in which the flat area is altered to not be flat, according to a pattern in which a sample value rises or falls from a difference sample immediately preceding the flat area to a difference sample at the start position, and a pattern in which a sample value rises or falls from a difference sample at the end position to a difference sample immediately subsequent to the flat area;
a difference signal averaging unit configured to sum sample values of the second difference signal in each frame and divide the sample values by the number of samples of the second difference signal in each frame to calculate a difference average value, and to subtract the difference average value from each of the sample values of the second difference signal to generate a third difference signal;

a requantization error generation unit configured to generate, based on the third difference signal, a requantization error signal in each frame expressed by the number of bits of a difference between the first number of quantization bits and a second number of quantization bits larger than the first number of quantization bits; and an addition unit configured to add the requantization error signal to the first digital music signal in each frame and output a second digital music signal having the second number of quantization bits.

2. A bit extension processing method comprising:

converting samples of a first digital music signal quantized with a first number of quantization bits, into frames by dividing the samples at each number of a plurality of samples;

calculating a first difference signal in which a difference sample is a difference value between two adjacent samples of the first digital music signal in each frame;

detecting a start position, an end position, and the number of difference samples of a flat area where two or more difference samples having the same sample value in the first difference signal are continuous;

setting one or more difference samples out of the difference samples of the flat area as a difference sample to be corrected, correcting a value of the sample to be corrected by adding or subtracting a correction value to or from the value of the sample to be corrected, and generating a second difference signal in which the flat area is altered to not be flat, according to a pattern in which a sample value rises or falls from a difference sample immediately preceding the flat area to a difference sample at the start position, and a pattern in which a sample value rises or falls from a difference sample at the end position to a difference sample immediately subsequent to the flat area;

summing sample values of the second difference signal in each frame and dividing the sample values by the number of samples of the second difference signal in each frame to calculate a difference average value, and subtracting the difference average value from each of the sample values of the second difference signal to generate a third difference signal;

generating, based on the third difference signal, a requantization error signal in each frame expressed by the number of bits of a difference between the first number of quantization bits and a second number of quantization bits larger than the first number of quantization bits; and adding the requantization error signal to the first digital music signal in each frame and generating a second digital music signal having the second number of quantization bits.

3. A non-transitory storage medium storing a bit extension processing program causing a computer to execute the steps of:

converting samples of a first digital music signal quantized with a first number of quantization bits, into frames by dividing the samples at each number of a plurality of samples;

calculating a first difference signal in which a difference sample is a difference value between two adjacent samples of the first digital music signal in each frame;

detecting a start position, an end position, and the number of difference samples of a flat area where two or more difference samples having the same sample value in the first difference signal are continuous;

setting one or more difference samples out of the difference samples of the flat area as a difference sample to be corrected, correcting a value of the sample to be corrected by adding or subtracting a correction value to or from the value of the sample to be corrected, and generating a second difference signal in which the flat area is altered to not be flat, according to a pattern in which a sample value rises or falls from a difference sample immediately preceding the flat area to a difference sample at the start position, and a pattern in which a sample value rises or falls from a difference sample at the end position to a difference sample immediately subsequent to the flat area;

summing sample values of the second difference signal in each frame and dividing the sample values by the number of samples of the second difference signal in each frame to calculate a difference average value, and subtracting the difference average value from each of the sample values of the second difference signal to generate a third difference signal;

generating, based on the third difference signal, a requantization error signal in each frame expressed by the number of bits of a difference between the first number of quantization bits and a second number of quantization bits larger than the first number of quantization bits; and adding the requantization error signal to the first digital music signal in each frame and generating a second digital music signal having the second number of quantization bits.

* * * * *